United States Patent
Tessmer et al.

(10) Patent No.: US 10,333,727 B2
(45) Date of Patent: Jun. 25, 2019

(54) REPLICATING BROADCAST, UNKNOWN-UNICAST, AND MULTICAST TRAFFIC IN OVERLAY LOGICAL NETWORKS BRIDGED WITH PHYSICAL NETWORKS

(71) Applicant: Nicira, Inc., Palo Alto, CA (US)

(72) Inventors: Alexander Tessmer, Mountain View, CA (US); Mukesh Hira, Palo Alto, CA (US); Rajiv Krishnamurthy, San Jose, CA (US); Ram Dular Singh, Cupertino, CA (US); Xuan Zhang, Palo Alto, CA (US); Hua Wang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/726,335

(22) Filed: Oct. 5, 2017

(65) Prior Publication Data

US 2018/0048478 A1 Feb. 15, 2018

Related U.S. Application Data

(63) Continuation of application No. 14/231,245, filed on Mar. 31, 2014, now Pat. No. 9,794,079.

(51) Int. Cl.
*H04L 12/18* (2006.01)
*H04L 12/741* (2013.01)
*H04L 12/46* (2006.01)

(52) U.S. Cl.
CPC .......... *H04L 12/18* (2013.01); *H04L 12/4641* (2013.01)

(58) Field of Classification Search
CPC ........................... H04L 12/18; H04L 12/4641
See application file for complete search history.

(56) References Cited

U.S. PATENT DOCUMENTS

| | | | |
|---|---|---|---|
| 5,224,100 A | 6/1993 | Lee et al. | |
| 5,331,634 A | 7/1994 | Fischer | |

(Continued)

FOREIGN PATENT DOCUMENTS

| | | |
|---|---|---|
| CN | 101282338 B | 8/2011 |
| EP | 1855420 A1 | 11/2007 |

(Continued)

OTHER PUBLICATIONS

PCT International Report on Patentability for commonly owned International Patent Application PCT/US2014/072892, dated Oct. 13, 2016, 10 pages, Nicira, Inc.

(Continued)

*Primary Examiner* — Kiet Tang
(74) *Attorney, Agent, or Firm* — Adeli LLP

(57) ABSTRACT

A novel method for performing replication of messages in a network that bridges one or more physical networks to an overlay logical network is provided. A physical gateway provides bridging between network nodes of a physical network and virtual machines in the overlay logical network by serving as an endpoint of the overlay logical network. The physical gateway does not replicate messages from the bridged physical network to destination endpoints in the overlay logical network directly, but instead tunnels the message-to-be-replicated to a designated tunnel endpoint in the overlay logical network. The designated tunnel endpoint in turn replicates the message that was tunneled to it to other endpoints in the overlay logical network.

21 Claims, 15 Drawing Sheets

(56) References Cited

U.S. PATENT DOCUMENTS

| | | |
|---|---|---|
| 5,729,685 A | 3/1998 | Chatwani et al. |
| 5,831,975 A | 11/1998 | Chen et al. |
| 5,926,463 A | 7/1999 | Ahearn et al. |
| 6,104,699 A | 8/2000 | Holender et al. |
| 6,181,697 B1 | 1/2001 | Nurenberg et al. |
| 6,192,417 B1 | 2/2001 | Block et al. |
| 6,728,777 B1 | 4/2004 | Lee et al. |
| 6,804,263 B1 | 10/2004 | Okawa |
| 6,836,481 B1 | 12/2004 | Hotta |
| 6,862,263 B1 | 3/2005 | Simmons |
| 6,901,510 B1 | 5/2005 | Srivastava |
| 6,917,985 B2 | 7/2005 | Madruga et al. |
| 6,934,252 B2 | 8/2005 | Mehrotra et al. |
| 6,950,428 B1 | 9/2005 | Horst et al. |
| 7,046,630 B2 | 5/2006 | Abe et al. |
| 7,209,439 B2 | 4/2007 | Rawlins et al. |
| 7,286,490 B2 | 10/2007 | Saleh et al. |
| 7,333,487 B2 | 2/2008 | Novaes |
| 7,529,199 B1 | 5/2009 | Wijnands et al. |
| 7,606,187 B2 | 10/2009 | Zeng et al. |
| 7,792,099 B2 | 9/2010 | Yasukawa et al. |
| 7,792,987 B1 | 9/2010 | Vohra et al. |
| 7,813,340 B2 | 10/2010 | Novaes |
| 7,876,754 B2 | 1/2011 | Novaes |
| 7,937,438 B1 | 5/2011 | Miller et al. |
| 7,961,646 B2 | 6/2011 | Liu et al. |
| 8,089,964 B2 | 1/2012 | Lo et al. |
| 8,223,649 B2 | 7/2012 | Rangarajan et al. |
| 8,224,971 B1 | 7/2012 | Miller et al. |
| 8,310,957 B1 | 11/2012 | Rekhter |
| 8,312,129 B1 | 11/2012 | Miller et al. |
| 8,391,185 B2 | 3/2013 | Wijnands et al. |
| 8,553,689 B2 | 10/2013 | Bachmann et al. |
| 8,612,627 B1 | 12/2013 | Brandwine |
| 8,625,603 B1 | 1/2014 | Ramakrishnan et al. |
| 9,432,204 B2 | 8/2016 | Shen et al. |
| 9,602,385 B2 | 3/2017 | Tessmer et al. |
| 9,602,392 B2 | 3/2017 | Tessmer et al. |
| 9,794,079 B2 | 10/2017 | Tessmer et al. |
| 9,887,851 B2 | 2/2018 | Shen et al. |
| 2002/0138618 A1* | 9/2002 | Szabo .............. H04L 12/26 709/225 |
| 2004/0267897 A1 | 12/2004 | Hill et al. |
| 2005/0111474 A1 | 5/2005 | Kobayashi |
| 2005/0147095 A1 | 7/2005 | Guerrero et al. |
| 2006/0045092 A1 | 3/2006 | Kubsch et al. |
| 2006/0182033 A1 | 8/2006 | Chen et al. |
| 2006/0187950 A1 | 8/2006 | Bou-Diab et al. |
| 2006/0239290 A1 | 10/2006 | Lin et al. |
| 2007/0058638 A1 | 3/2007 | Guichard et al. |
| 2007/0253409 A1 | 11/2007 | Fu et al. |
| 2008/0002727 A1 | 1/2008 | Yamane |
| 2008/0020758 A1 | 1/2008 | Nagarajan et al. |
| 2008/0059556 A1 | 3/2008 | Greenspan et al. |
| 2008/0071900 A1 | 3/2008 | Hecker et al. |
| 2008/0104273 A1 | 5/2008 | Bruck et al. |
| 2008/0175239 A1 | 7/2008 | Sistanizadeh et al. |
| 2008/0186962 A1 | 8/2008 | Sinha |
| 2008/0205302 A1 | 8/2008 | Florit et al. |
| 2008/0212496 A1 | 9/2008 | Zou |
| 2009/0285206 A1 | 11/2009 | Kawauchi et al. |
| 2010/0002698 A1 | 1/2010 | Clack et al. |
| 2010/0106779 A1 | 4/2010 | Yamauchi |
| 2010/0157888 A1 | 6/2010 | Aggarwal et al. |
| 2010/0157889 A1 | 6/2010 | Aggarwal et al. |
| 2010/0271948 A1 | 10/2010 | Challapali et al. |
| 2010/0284402 A1 | 11/2010 | Narayanan |
| 2011/0022652 A1 | 1/2011 | Lai et al. |
| 2011/0075664 A1 | 3/2011 | Lambeth et al. |
| 2011/0202920 A1 | 8/2011 | Takase |
| 2011/0280572 A1 | 11/2011 | Vobbilisetty et al. |
| 2011/0317696 A1 | 12/2011 | Aldrin et al. |
| 2012/0106950 A1 | 5/2012 | Madrahalli et al. |
| 2012/0155322 A1 | 6/2012 | Lamba et al. |
| 2012/0177042 A1 | 7/2012 | Berman |
| 2012/0185553 A1 | 7/2012 | Nelson |
| 2012/0233326 A1 | 9/2012 | Shaffer et al. |
| 2012/0236734 A1 | 9/2012 | Sampath et al. |
| 2012/0254943 A1 | 10/2012 | Li |
| 2012/0278804 A1 | 11/2012 | Narayanasamy et al. |
| 2012/0307826 A1 | 12/2012 | Matsuoka |
| 2013/0040677 A1 | 2/2013 | Lee et al. |
| 2013/0114597 A1 | 5/2013 | Ogisawa et al. |
| 2013/0124750 A1 | 5/2013 | Anumala et al. |
| 2013/0159826 A1 | 6/2013 | Mason et al. |
| 2013/0266015 A1* | 10/2013 | Qu .............. H04L 45/74 370/392 |
| 2013/0318219 A1 | 11/2013 | Kancherla |
| 2014/0052877 A1 | 2/2014 | Mao |
| 2014/0098814 A1 | 4/2014 | Bansal et al. |
| 2014/0169366 A1 | 6/2014 | Kotalwar et al. |
| 2014/0192804 A1 | 7/2014 | Ghanwani et al. |
| 2014/0195666 A1 | 7/2014 | Dumitriu et al. |
| 2014/0243035 A1 | 8/2014 | Jung et al. |
| 2014/0372624 A1 | 12/2014 | Wang et al. |
| 2015/0055651 A1 | 2/2015 | Shen et al. |
| 2015/0131655 A1 | 5/2015 | Dayama et al. |
| 2015/0147095 A1 | 5/2015 | Iketani |
| 2015/0163100 A1 | 6/2015 | Graf et al. |
| 2015/0172132 A1 | 6/2015 | Tessmer et al. |
| 2015/0172165 A1 | 6/2015 | Tessmer et al. |
| 2015/0254190 A1 | 9/2015 | Yang et al. |
| 2015/0280928 A1 | 10/2015 | Tessmer et al. |
| 2016/0352531 A1 | 12/2016 | Shen et al. |
| 2017/0171061 A1 | 6/2017 | Tessmer et al. |
| 2018/0159696 A1 | 6/2018 | Shen et al. |

FOREIGN PATENT DOCUMENTS

| | | |
|---|---|---|
| GB | 2458154 A | 9/2009 |
| JP | 2001230774 A | 8/2001 |
| JP | 2005184234 A | 7/2005 |
| JP | 2006121517 A | 5/2006 |
| JP | 2006229967 A | 8/2006 |
| JP | 2009272803 A | 11/2009 |
| JP | 2010103757 A | 5/2010 |
| JP | 2011171874 A | 9/2011 |
| WO | 2004082221 A2 | 9/2004 |
| WO | 2006095391 A1 | 9/2006 |
| WO | 2013009850 A1 | 1/2013 |
| WO | 2015152976 A1 | 10/2015 |

OTHER PUBLICATIONS

International Search Report and Written Opinion of commonly owned International Patent Application PCT/US2014/072892, dated Jun. 2, 2015, 13 pages, Nicira, Inc.

Casado, Martin, et al. "Ethane: Taking Control of the Enterprise," SIGCOMM'07, Aug. 27-31, 2007, 12 pages, ACM, Kyoto, Japan.

Casado, Martin, et al., "SANE: A Protection Architecture for Enterprise Networks," Proceedings of the 15th USENIX Security Symposium, Jul. 31, 2006, 15 pages.

Dumitriu, Dan Mihai, et al. (U.S. Appl. No. 61/514,990), filed Aug. 4, 2011.

Gross, J., et al., "Geneve: Generic Network Virtualization Encapsulation," Feb. 14, 2014, 24 pages, Internet Engineering Task Force (IETF).

Narten, Thomas, et al., "Address Resolution Problems in Large Data Center Networks," Jan. 2013, 17 pages, Internet Engineering Task Force (IETF).

\* cited by examiner

REPLICATING BROADCAST, UNKNOWN-UNICAST, AND MULTICAST TRAFFIC IN OVERLAY LOGICAL NETWORKS BRIDGED WITH PHYSICAL NETWORKS

CLAIM OF BENEFIT TO PRIOR APPLICATIONS

This application is a continuation application of U.S. patent application Ser. No. 14/231,245, filed Mar. 31, 2014, and now published as U.S. Patent Publication 2015/0280928. U.S. patent application Ser. No. 14/231,245, now published as U.S. Patent Publication 2015/0280928, is incorporated herein by reference.

BACKGROUND

Overlay Logical Switches (or overlay logical networks) provide L2 (layer 2) connectivity to a collection of Virtual Machines (VMs) over an underlying L3 (layer 3) network. The overlay is implemented using a tunneling mechanism such as VXLAN (Virtual eXtensible Local Area Network), STT (Stateless Transport Tunneling), GRE (Generic Routing Encapsulation), etc. Of these, VXLAN is gaining traction in the networking industry and is being implemented in physical switches from a number of switch vendors.

Since certain applications may be hosted on physical servers, there is often a need to provide layer 2 connectivity between a number of ports/VLANs in the physical network and an overlay logical network. Handling of traffic destined to Broadcast/Unknown-unicast/Multicast (BUM) MAC addresses poses some challenges. Such traffic needs to be replicated and delivered to all virtual machines that have an interface on the overlay logical switch, and all physical machines on physical networks/VLANs being connected with the overlay logical switch.

However, many physical gateways providing connectivity between VLANs in the physical network and the logical switch are often top-of-rack (ToR) hardware switches that are incapable of subscribing to multicast groups and therefore incapable of receiving IP multicast traffic. Thus if a ToR was to send BUM traffic on a multicast group, other ToRs would not be able to receive it even if the underlying physical network supported IP multicast. Moreover, many physical gateways are incapable of replicating a packet from a physical machine into multiple VXLAN-encapsulated packets or replicating a packet received on a physical network onto multiple VXLAN tunnels.

SUMMARY

Some embodiments provide a method for performing replication of messages in a network that bridges one or more physical networks to an overlay logical network. In some embodiments, a physical gateway provides bridging between network nodes of a physical network and virtual machines in the overlay logical network by serving as an endpoint of the overlay logical network. The physical gateway does not replicate messages from the bridged physical network to destination endpoints in the overlay logical network directly, but instead tunnels the message-to-be-replicated to a designated tunnel endpoint in the overlay logical network. The designated tunnel endpoint in turn replicates the message that was tunneled to it to other endpoints in the overlay logical network. In some embodiments, the replicated message is a packet having destination MAC address that corresponds to multiple recipients or no specific recipient (e.g., broadcast, unknown unicast, multicast, i.e., BUM).

Some physical gateways are ToR switches that are incapable of subscribing to multicast groups and therefore unable to receive BUM traffic as members of a multicast group. Some embodiments choose one or more hypervisors participating in the overlay as Physical-network Tunneling End Points (PTEPs) for handling BUM traffic on behalf of ToRs. The controller in some of these embodiments selects one or more PTEPs for each logical switch and programs the tunneling IP (VTEP-IP) addresses of these chosen PTEPs onto the ToRs. These PTEPs serve as candidate intermediate destination tunneling endpoints for BUM traffic from ToRs. For such a ToR to send BUM traffic onto a particular logical switch, it tunnels the BUM packet to one of these PTEPs using unicast and then let the PTEP sends the BUM packet to a multicast group that correspond to the particular logical switch.

In some embodiments, a PTEP is a hypervisor that is selected and configured to handle the BUM traffic from ToRs to an overlay logical network. In some embodiments, each overlay logical network has its corresponding set of PTEPs, and different logical networks can have different sets of PTEPs. In some embodiments, the network controller selects hypervisors to serve as PTEPs in a manner that balances traffic load or computation load across different host machines. In some embodiments, an overlay logical network can have multiple PTEPs, and a ToR has multiple PTEPs to choose from for sending BUM traffic. Such choice can be based on load balancing algorithms in some embodiments.

In some embodiments, the underlying fabric does not support L3 multicast. Rather than letting the PTEP replicate traffic to each destination by unicast, some embodiments designates a set of hypervisors as multicast tunneling endpoints (MTEPs) to serve as multicast proxies. A PTEP in turn sends BUM traffic in unicast to these MTEPs and let the MTEPs complete the BUM traffic replication to each destination. In some embodiments, the underlying fabric supports L2 multicast within physical L2/link layer segments or multicast islands. Some of these embodiments designate one hypervisor as MTEP per L2 physical segment per logical switch. In some embodiments, a MTEP of a segment can be configured to use either multicast or unicast to replicate BUM traffic to other endpoints of its segment.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for performing replication of messages in a network that bridges one or more physical networks to an overlay logical network, the replication of messages performed by endpoints of the overlay logical network. In some embodiments, a physical gateway is an L2 gateway that provides bridging between network nodes of a physical network and virtual machines in the overlay logical network by serving as an endpoint of the overlay logical network. The bridging physical gateway does not replicate messages from the bridged physical network to destination endpoints in the overlay logical network directly, but instead tunnels the message-to-be-replicated to a designated tunnel endpoint in the overlay logical network. The designated tunnel endpoint in turn replicates the message that was tunneled to it to other endpoints in the overlay logical network and to other physical gateways. In some embodiments, the replicated message is a packet having destination MAC address that corresponds to multiple recipients (e.g., broadcast or multicast) or a single recipient whose location is not known (e.g., unknown unicast).

Figure 1:
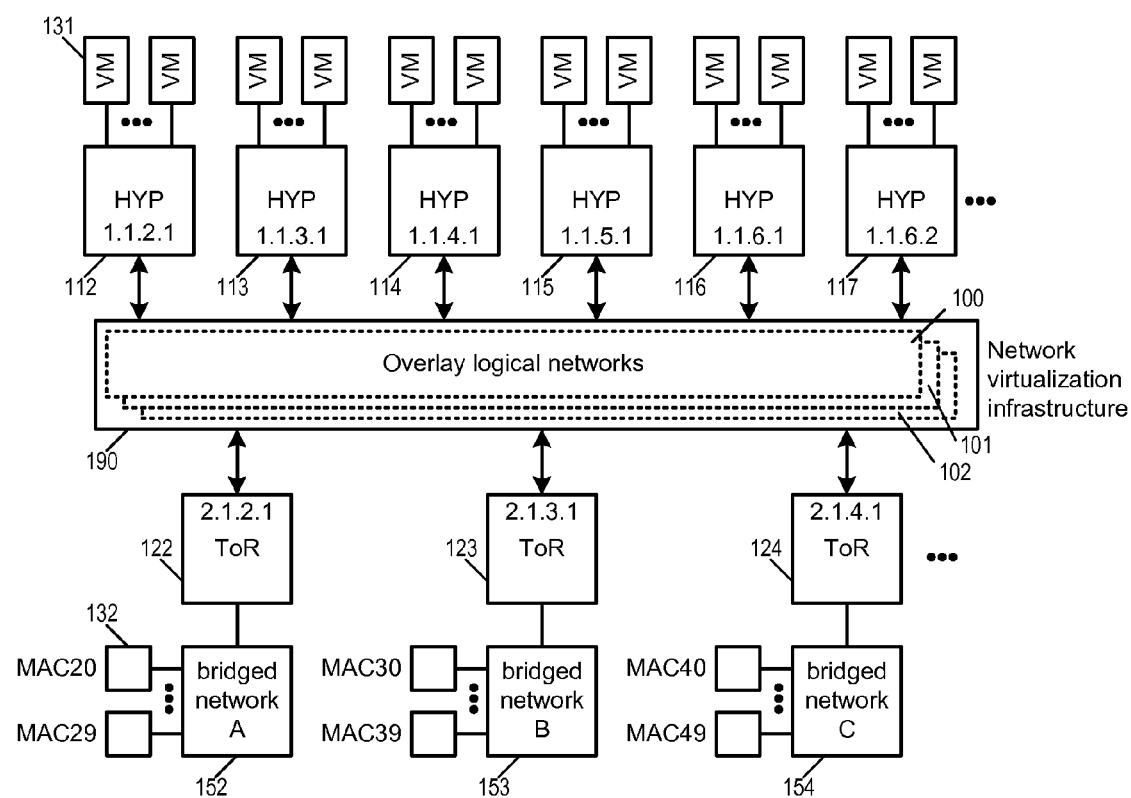
FIG. 1 illustrates overlay logical networks that are bridged with physical networks through physical gateways.

For some embodiments, FIG. 1 illustrates overlay logical networks that are bridged with physical networks through physical gateways. The overlay logical network is built over an underlying fabric that supports layer 3 IP forwarding between various tunnel endpoints. The physical gateway integrates the bridged physical networks with the overlay logical networks. Some of the endpoints are host machines that operate one or more virtual machines (VMs) and support encapsulated traffic in the overlay logical networks on behalf of the hosted VMs.

In some embodiments, the physical networks being bridged to the overlay logical networks refer to networking hardware that does not support encapsulated traffic of the overlay logical networks. The network nodes residing in physical networks conduct traffic with the overlay logical networks by bridging via the physical gateways. The physical gateways in turn serve as endpoints in the overlay logical networks. This allows the physical gateways to encapsulate traffic from the physical networks to the overlay logical networks and to de-capsulate traffic from the overlay logical networks to the physical networks.

As illustrated, a network virtualization infrastructure 190 is supporting several overlay logical networks 100-102. The overlay logical network 100 is connected to by (i.e., having link layer or L2 connectivity with) host machines 112-117 and by physical gateways 122-124. The physical gateway 122 is for bridging network nodes in a physical network 152 with the overlay logical network 100. The physical gateways 123 and 124 are likewise for bridging nodes in physical networks 153 and 154 with the overlay logical network 100.

The overlay logical networks 100-102 is implemented on a physical network virtualization infrastructure 190 for data communication between entities or nodes that are connected to its underlying networking hardware fabric. In some embodiments, the network virtualization infrastructure 190 encompasses numerous physically distinct sets of communication pathways that are communicatively interlinked to support the overlay logical networks 100-102. In some embodiments, at least some of these physically distinct sets of communication pathways have different topologies and/or use different communication protocols. In some embodiments, an overlay logical network (e.g., 100) spans across one or more data centers and/or (internet service) provider networks such that at least some of the physically distinct sets of communication pathways are in the data centers or provider networks. In some embodiments, the network virtualization infrastructure 190 is a physical IP network (L3) that may be divided into multiple physical L2 networks (VLANs), IP subnets, and multicast islands.

In some embodiments, an overlay logical network operates as an overlay logical switch that provides L2 connectivity to a collection of VMs over an underlying L3 network (hence the terms "logical switch" and "overlay logical network" are interchangeably used). The overlay is implemented using a tunneling mechanism such as VXLAN. In the example of FIG. 1, the overlay logical network 100 provides L2 connectivity to a collection of at least some of the VMs operating in the host machines 112-116, the L2 connectivity being provided by an overlay on the underlying L3 network of the network virtualization infrastructure 190.

In order to manage the operations of the VMs as well as their access to the physical resources and the network resources of the host machines, each host machine is operating virtualization software. The virtualization software provides an interface (VM interface, or VIF) between each VM and a logical switch supported by the underlying network. Virtualization software may include one or more software components and/or layers, possibly including one or more of the software components known in the field of virtual machine technology as virtual machine monitors (VMMs), hypervisors, or virtualization kernels. Because virtualization terminology has evolved over time and has not yet become fully standardized, these terms do not always provide clear distinctions between the software layers and components to which they refer. As used herein, the term, "hypervisor" is intended to generically refer to a software layer or component logically interposed between a virtual machine and the host platform.

A host machine operating one or more VMs connected to (i.e., having link layer or L2 connectivity with) an overlay logical network or logical switch functions as a tunneling endpoint of that overlay logical network, and in the case of VXLAN tunnels this functionality is referred to as VXLAN Tunneling End Point (VTEP). In some embodiments, the VTEP functionality of a host machine is provided by its hypervisor. In some embodiments, a unique IP address is assigned to each VTEP as its tunneling IP (or VTEP-IP). A host machine running a hypervisor uses its VTEP-IP as the source IP address for tunneling logical switch traffic it receives from the VMs it hosts. The hypervisor's VTEP-IP is also used as the destination IP address when other hypervisors tunnel traffic destined to the VMs on the hypervisor. In the example of FIG. 1, the host machines (i.e., hypervisors) 112-117 have VTEP-IP addresses 1.1.2.1, 1.1.3.1, 1.1.4.1, 1.1.5.1, 1.1.6.1, and 1.1.6.2, respectively. It is worth mentioning that overlay logical networks can span multiple different IP subnets, and the VTEP-IPs of tunneling endpoints of an overlay likewise can span different IP subnets.

As illustrated, the underlying L3 network of the network virtualization infrastructure 190 is also supporting other overlay logical networks 101-102, and some of the VMs operating in the host machines 112-117 are network nodes in those other logical networks 101-102. In some embodiments, each host machine consequently serves as an endpoint in those other overlay logical networks 101-102 in addition to the overlay logical network 100. In some of these embodiments, the VTEP-IP of a host machine is shared across all logical switches that the host machine is serving as an endpoint. In some embodiments, a host machine (i.e., its hypervisor) serves as an endpoint of an overlay logical network only when it is hosting a VM that is a network node in that particular logical overlay logical network (i.e., having a VM interface to the corresponding logical switch.)

The physical gateways 122-124 connect physical networks 152-154 to the overlay logical network 100. As mentioned, the physical networks 152-154 do not support direct overlay network tunneling between its network nodes and the overlay logical networks. In order for network nodes in the physical network 152-154 to be bridged onto the overlay logical network 100, the physical gateway 122-124 serve as tunneling endpoints in the overlay logical network 100. Moreover, each physical gateway is assigned a VTEP-IP for when serving as an endpoint in the overlay logical network 100 (or in other overlay logical networks 101 or 102). The physical gateway 122 is assigned VTEP-IP 2.1.2.1, the physical gateway 123 is assigned VTEP-IP 2.1.3.1, and the physical gateway 124 is assigned VTEP-IP 2.1.4.1. In some embodiments, physical gateways are "top of rack" hardware switches or routers ("ToRs") provided by hardware switch vendors that are capable of being integrated into overlay logical networks by serving as tunneling endpoints. As is the case with hypervisors, VTEP-IPs of physical gateways can span different IP subnets.

In some embodiments, a physical gateway performs bridging by mapping destination MAC addresses to overlay logical networks and VTEP-IPs. In other words, when a packet arrives at a physical gateway from a network node in a physical network, the bridge would find the logical switch being bridged with the network node and the corresponding VTEP-IP for the destination MAC address and tunnel the packet accordingly. In some embodiments, each physical gateway learns such mapping adaptively from the network traffic in the underlying network virtualization infrastructure 190. In some embodiments, such mappings are provided to the physical gateways 122-124 by a network controller. In some embodiments, each of such provided mappings is in form of a binding <MAC address, logical switch, VTEP-IP>.

In some embodiments, each physical gateway also learns the MAC addresses from the physical network that it interfaces with. In the example of FIG. 1, the physical gateways 122-124 learn the MAC addresses present in the physical network 152-154, respectively. Each physical gateway stores the learned MAC addresses in a database (e.g., OVSDB), which is retrievable by the network controller. The network controller in turn provides the learned MAC addresses to other VTEPs in form of a binding <MAC address, logical switch, VTEP-IP>.

Thus, the network controller collects MAC addresses from all VTEPs (host machines of VMs as well as physical gateways) and programs the <MAC address, logical switch, VTEP-IP> bindings in all VTEPs. The collection of MAC addresses and the programing of <MAC address, logical switch, VTEP-IP> bindings will be further described below by reference to FIG. 13. In some embodiments, such a controller is a machine or a cluster of machines hosting controller software. The controller software manages the logical switches and is aware of the MAC address of the VMs attached to the logical switches from the collected MAC addresses and VTEP-IPs.

As mentioned, in some embodiments, the network nodes in physical networks being bridged do not operate the logical switches in the network virtualization infrastructure 190, but are instead organized into different network domains such as different VLANs. In some of these embodiments, each of these network domains is mapped to one of the overlay logical networks/logical switches in the network virtualization infrastructure 100. For example, if network domain "VLAN10" of the physical network 152 is mapped to logical switch "VXLAN100" of the network virtualization infrastructure, a network node having MAC address "MAC20" in "VLAN10" would result in a binding of <MAC20, VXLAN100, 2.1.2.1>, 2.1.2.1 being the VTEP-IP of the physical gateway 122 for the physical network 152. Upon receiving such a binding, a VTEP would able to identify "MAC20" as being associated with the VTEP-IP "2.1.2.1" and knows to tunnel a packet to 2.1.2.1 if the destination MAC of a packet is "MAC20".

Figure 2A:
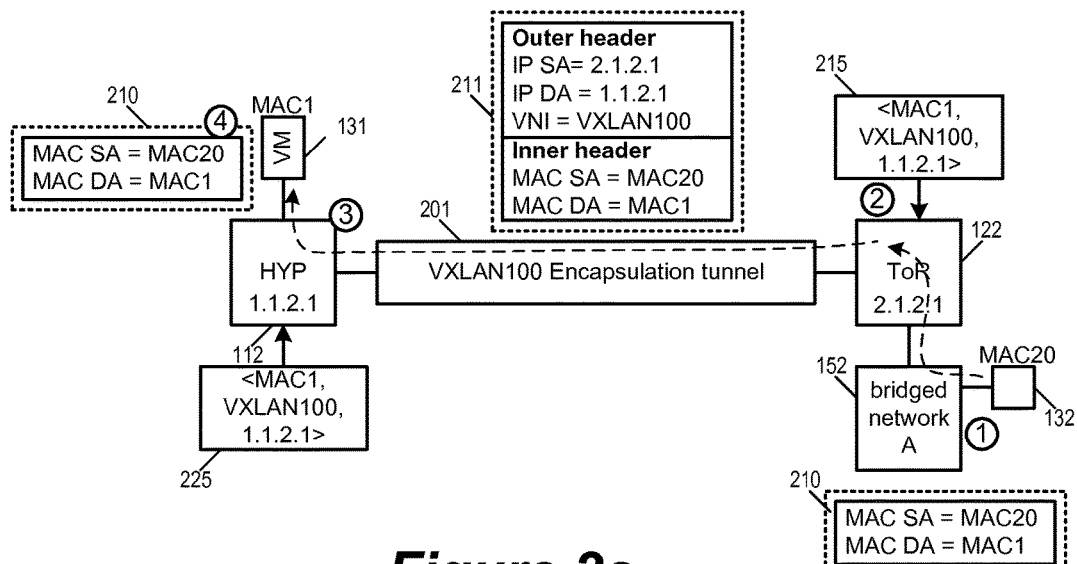
FIGS. 2a-b illustrates the overlay tunneling between a VM and a network node from a physical network by using a physical gateway as a tunneling endpoint.
Figure 2B:
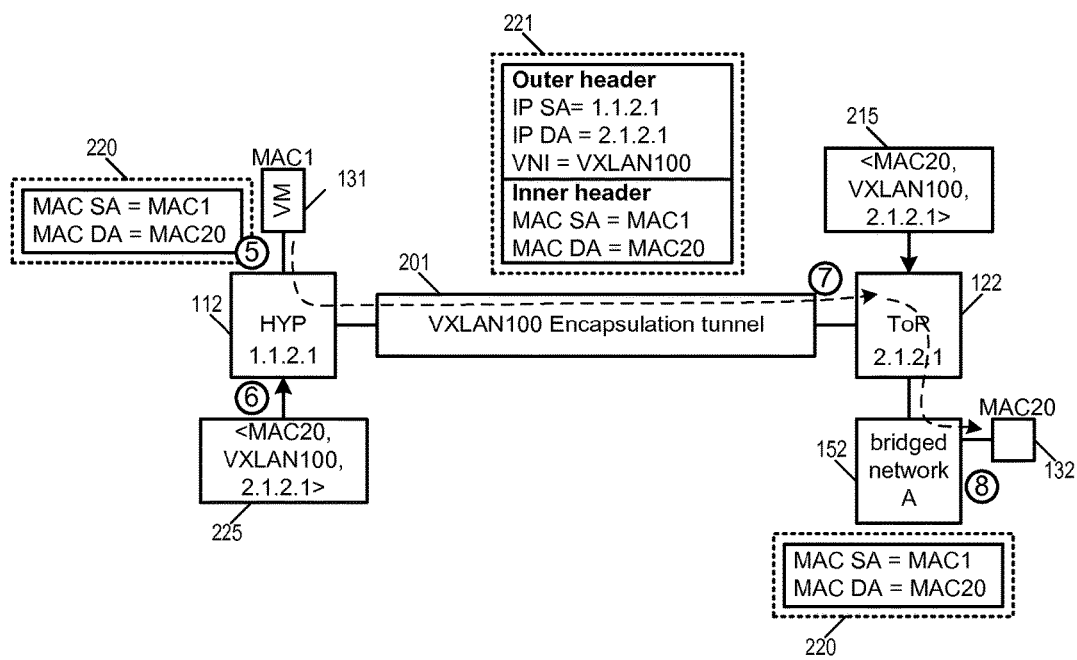

FIGS. 2a-b illustrate the overlay tunneling between a VM 131 and a network node 132 from the physical network 152 by using the physical gateway 122 as a tunneling endpoint. The VM 131 is a virtual machine operating in the host machine 112 running a hypervisor, which provides an interface to a VXLAN100 logical switch 200 for the VM 131. The network node 132 is connected to the physical network 152. The network node 131 has MAC address "MAC1", while the network node 132 has MAC address "MAC20". The physical network 152 does not support VXLAN and consequently the network node 132 cannot be a tunnel endpoint. In order for the network node 132 to send packets to VMs in VXLAN100, the physical gateway 122 would act as a tunneling endpoint on behalf of the network node 132.

FIG. 2a illustrates the tunneling of a packet 210 from the network node 132 to the VM 131 in operations labeled '1' through '4'. At operation '1', the network node 132 produces the packet 210, which has "MAC20" as source MAC address and "MAC1" as destination address. At operation '2', the packet 210 arrives at the physical gateway 122, and the physical gateway 122 finds that the port/VLAN that the packet was received on is being bridged with VXLAN100. The physical gateway in turn uses a table 215 to find a binding for "MAC1" in VXLAN100. Such a table is provided to the physical gateway 122 by a network controller as discussed above. The binding informs the physical gateway that "MAC1" is behind a VTEP-IP 1.1.2.1 in logical switch "VXLAN100". Based on this binding, the physical gateway 122 encapsulates the packet 210 to produce an encapsulated packet 211. The encapsulated packet 211 has an inner portion and an outer portion. The inner portion corresponds to the packet 210, which has a header (inner header) that indicates the source and destination MAC addresses (e.g., used by Ethernet). The outer portion has a header (outer header) that indicates the source and destination tunneling IP addresses (e.g., used by VXLAN). The outer header indicates that VTEP-IP 2.1.2.1 (of the physical gateway 122) is the source address and the VTEP-IP 1.1.2.1 is the destination address. The outer header of the encapsulated packet 211 also carries an overlay logical network identifier (e.g., VXLAN network identifier, or VNI) that identifies "VXLAN100" as the logical switch that the traffic belongs to. Based on this identifier, the encapsulated packet 211 is sent into a VXLAN100 tunnel 201 operated by the logical switch 200 for VXLAN100. This identifier also allows the receiving hypervisor 112 to recognize that the packet 211 comes from the logical network VXLAN100.

At operation '3', the host machine 112, which has VTEP-IP 1.1.2.1, receives the encapsulated packet 211 at the end of the VXLAN100 tunnel 201. The hypervisor looks up (using a table 225) MAC destination MAC1 in VXLAN100, finds a binding <MAC1, VXLAN100, 1.1.2.1>. Some embodiments uses this binding instead of relying on destination MAC address alone for delivering packet to destination VM because it is theoretically possible that a same MAC address is used by network nodes in different VXLANs or VLANs. At operation '4', hypervisor of the host machine 112 restores the original packet 210 from the encapsulated packet 211. The restored original packet 210 is then forwarded to the VM 131, which is a VM connected to VXLAN100 and whose MAC address "MAC1" matches that of the destination MAC address in the packet 210.

FIG. 2b illustrates the tunneling of a packet 220 from the VM 131 to the network node 132 in operations labeled '5' through '8'. At operation '5', the VM 131 produces the packet 220, which has "MAC1" as source MAC address and "MAC20" as destination address.

At operation '6', the packet 220 arrives at the hypervisor of the host machine 112 on an interface that is in VXLAN100, the hypervisor looks up MAC20 in VXLAN100 (by using the table 225) and finds a binding for "MAC20" that is in "VXLAN100". Such a table is provided to the host machine 112 by a network controller as discussed above. The binding informs the hypervisor that "MAC20" is behind a VTEP-IP 2.1.2.1 in overlay logical network "VXLAN100".

Based on this binding, the hypervisor 112 encapsulates the packet 220 to produce an encapsulated packet 221. The encapsulated packet 221 has an inner portion and an outer portion. The inner portion corresponds to the packet 220, which has a header that indicates the source and destination MAC addresses. The outer portion has a header that indicates that VTEP-IP 1.1.2.1 (of the host machine 112) is the source address and the VTEP-IP 2.1.2.1 is the destination address. The outer header of the encapsulated packet 221 also carries an identifier (VNI) that identifies "VXLAN100" as the logical switch that the traffic belongs to. Based on this identifier, the encapsulated packet 221 is sent into a VXLAN100 tunnel 202 operated by the logical switch 200 for VXLAN100.

At operation '7', the physical gateway 122, which has VTEP-IP 2.1.2.1, receives the encapsulated packet 221 at the end of the VXLAN100 tunnel 202. The physical gateway looks up (by using the table 215) MAC destination MAC20 in VXLAN100, finds a binding <MAC20, VXLAN100, 2.1.2.1>. Some embodiments uses this binding instead of relying on destination MAC address alone for delivering packet to destination network node because it is theoretically possible that a same MAC address is used by network nodes in different VXLANs or VLANs.

At operation '8', physical gateway 122 restores the original packet 220 from the encapsulated packet 221. The restored original packet 220 is then forwarded to the network node 132 which is on a physical network being bridged with VXLAN100 and whose MAC address "MAC20" is that of the destination MAC address in the packet 220.

FIGS. 2a-b describe how a physical gateway for bridging a physical network into an overlay logical network is able to serve as a tunneling endpoint in the overlay logical network when the traffic is unicast (i.e., one VTEP to another VTEP). In some embodiments, endpoints in overlay logical networks such as VXLAN also send traffic to a multicast group of VTEPs (i.e., traffic from one VTEP to multiple VTEPs). VTEPs in such an overlay logical network in some embodiments use the multicast group to handle broadcast, unknown unicast, or multicast (BUM) traffic within the overlay logical network, where a multicast group is defined to encompass the recipients of the BUM traffic within the overlay logical network. In some embodiments, each overlay logical network/logical switch has its corresponding multicast group for conducting BUM traffic.

As mentioned, some physical gateways are ToR switches, and some of these ToR switches are incapable of subscribing to multicast groups and therefore unable to receive BUM traffic from an overlay logical network as members of a multicast group. Some physical gateways are also incapable of replicating a packet received on the physical network onto multiple unicast VXLAN tunnels to other ToR switches. Consequently, for replicating traffic originating in the physical network, some embodiments choose one or more host machines running hypervisors participating in the overlay as Physical-network Tunneling End Points (PTEPs) for handling BUM traffic on behalf of ToRs. The controller in some of these embodiments selects one or more PTEPs for each logical switch and programs the tunneling IP (VTEP-IP) addresses of these chosen PTEPs onto the ToRs. These PTEPs serve as candidate intermediate destination tunneling endpoints for BUM traffic from ToRs. For such a ToR to send BUM traffic onto a particular logical switch, it tunnels the BUM packet to one of these PTEPs using unicast. The PTEP can then send the BUM packet to a multicast group that corresponds to the particular logical switch and replicate the packet to other ToRs over unicast VXLAN tunnels.

Figure 3A:
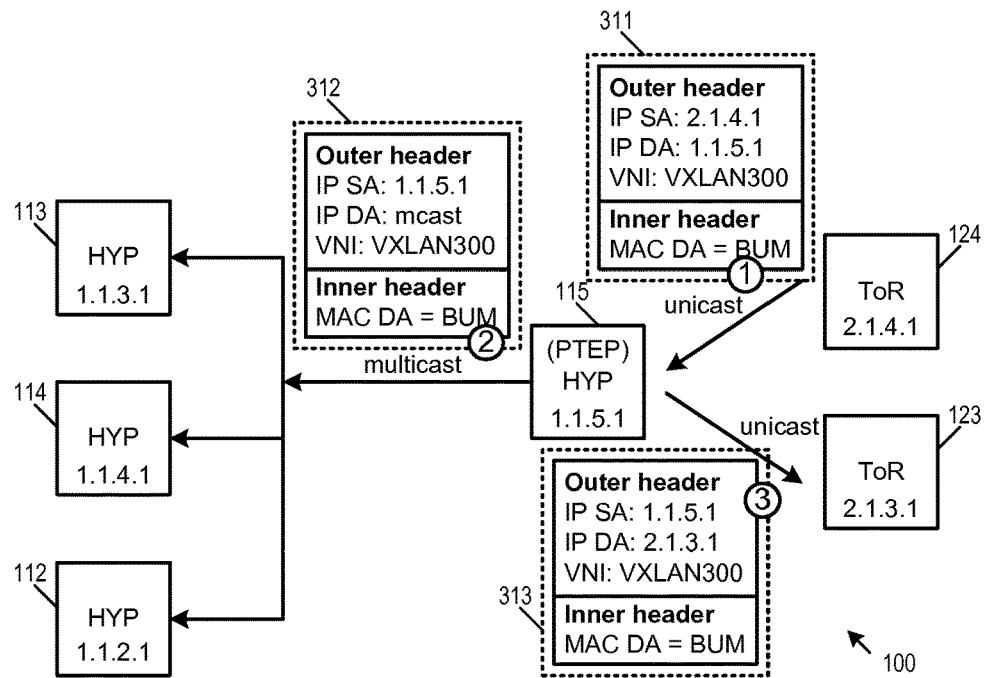
FIG. 3a illustrates how a PTEP handles BUM traffic from a ToR in an overlay logical network.

FIG. 3a illustrates how a PTEP handles BUM traffic from a ToR in an overlay logical network. For this example, the hypervisor of the host machine 115 has been chosen as a PTEP for an overlay logical network VXLAN300. VXLAN300 provides L2 connectivity to VMs in host machines 112-114, as well as network nodes behind ToRs 123 and 124 (which are physical gateways).

In operations labeled '1' through '3', FIG. 3a illustrates the transmission of a BUM packet from the ToR 124 to other network nodes in VXLAN300. At operation '1', the ToR 124 tunnels an encapsulated packet 311 by unicast to the PTEP 115. The packet 311 is an encapsulated packet for VXLAN300, whose outer header indicates that 2.1.4.1 (the VTEP-IP of the ToR 124) is the source IP address and 1.1.5.1 (the VTEP-IP of the PTEP 115) is the destination IP address. The destination MAC address specified by the inner header of the packet 311 is for BUM traffic (broadcast, unknown unicast, or multicast). In other words, the ToR 124 encapsulates the BUM traffic and tunnels the encapsulated traffic to the PTEP 115 by unicast.

At operation '2', the PTEP 115 recognizes from the inner header of the packet 310 that the content is BUM traffic for VXLAN300. The PTEP 115 accordingly re-encapsulates the BUM content into encapsulated packet 312 for transmission to host machines 112-114. Since the host machines 112-114 have subscribed to a multicast group that corresponds to VXLAN300, the PTEP 115 can send the encapsulated packet 312 to the host machines 112-114 by using the multicast group as the destination IP address in the outer header of the packet 312. In some embodiments, the underlying network virtualization infrastructure support L3 multicast, thus the packet 312 can rely on L3 multicast to reach VTEPs in the multicast group (i.e., host machines 112-114) in one transmission. The use of L3 multicast for sending BUM traffic will be further described by reference to FIG. 5 below. In some embodiments, the underlying network virtualization infrastructure does not support L3 multicast. The PTEP in some of these embodiments sends the packet by unicast to a set of multicast tunneling endpoints (MTEPs) and let the MTEPs relay the packet to the endpoints in the multicast group. The use of MTEPs will be further described by reference to FIGS. 7-9 below.

At operation '3', the PTEP 115 sends the BUM traffic to the other ToR 123 by unicast. The BUM traffic is encapsulated in a packet 313, which has an outer header that indicates that the source IP address is 1.1.5.1 (tunneling IP of PTEP 115) and the destination IP address is 2.1.3.1. The ToR 123, having tunneling IP 2.1.3.1, accepts the packet 313.

In some embodiments, PTEPs are not used for handling BUM traffic coming from a VM, even if the BUM traffic is to be replicated to a ToR. This is because using a PTEP to receive IP multicast traffic on behalf of ToRs introduces an extra hop of unicast tunneling transmissions between the PTEP and its ToRs. Consequently, in some embodiments, BUM traffic from a VM is transmitted to each of the ToRs by unicast from the source VTEP.

Figure 3B:
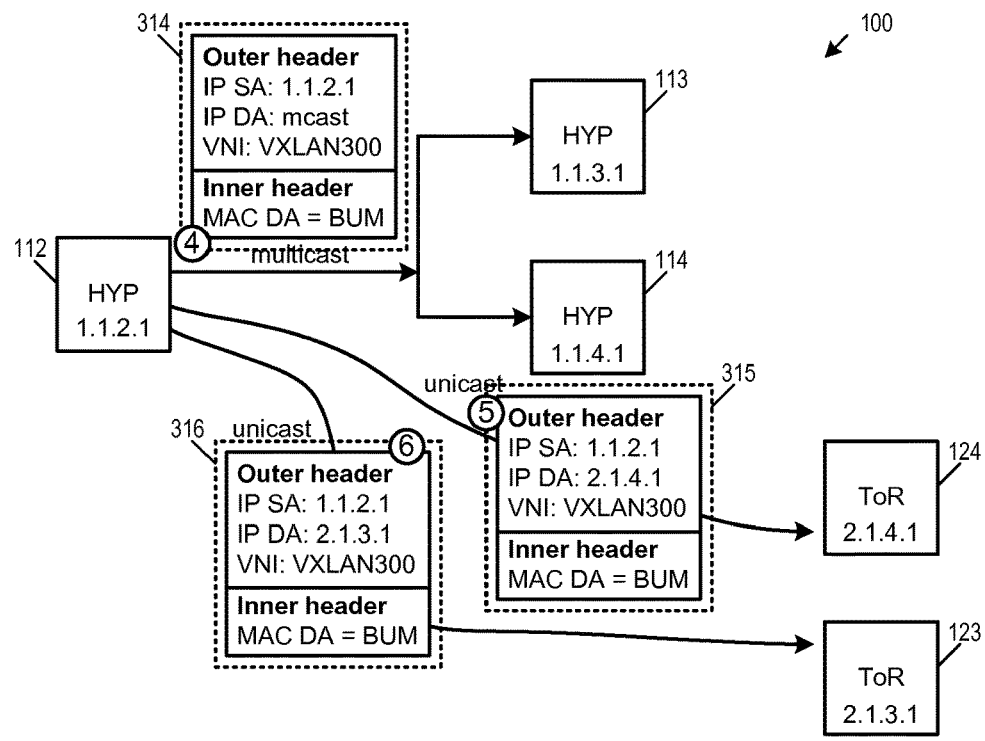
FIG. 3b illustrates the transmission of BUM traffic from a VM in an overlay logical network that includes ToRs as endpoints.

FIG. 3b illustrates the transmission of BUM traffic from a VM in an overlay logical network that includes ToRs as endpoints. Specifically, FIG. 3b illustrates the transmission of a BUM packet in the logical switch for VXLAN300, which includes host machines 112-114 and ToRs 123 and 124. The BUM packet is from a VM behind the host machine 112, therefore the PTEP 115 is not used for this transmission.

In operations labeled '4' through '6', FIG. 3b illustrates the transmission of a BUM packet from the ToR 124 to other network nodes in VXLAN300. At operation '4', the hypervisor of the host machine 112 encapsulates the BUM traffic in an encapsulated packet 314. The encapsulated packet 314 is transmitted to a multicast group that includes host machines 113 and 114. The host machines 113 and 114 would accept the packet 314 as members of the multicast group. As mentioned, in some embodiments, the underlying network infrastructure supports L3 multicast and the transmission of the packet 314 uses L3 multicast. In some embodiments, the underlying infrastructure does not support L3 multicast and the transmission of the packet 314 uses MTEPs as multicast proxies.

At operation '5', the host machine 112 sends the same BUM traffic content to the ToR 124 as unicast. The traffic is encapsulated in a packet 315, whose outer header indicates that the source IP address 1.1.2.1 (the tunneling IP of the host machine 112) and the destination IP address is 2.1.4.1 (the tunneling IP of the ToR 124). Likewise, at operation '6', the host machine 112 sends the same BUM traffic content to ToR 125 as unicast in another encapsulated packet 316, whose outer destination address is the tunneling IP 2.1.3.1 (the tunneling IP of the ToR 123).

Several more detailed embodiments of the invention are described below. Section I further describes the handling of BUM traffic from ToRs. Section II describes the programming of VTEPs in order to support BUM traffic transmission. Section III describes an example host machine that implements some embodiments of the invention in a virtualization environment. Finally, section IV describes an electronic system with which some embodiments of the invention are implemented.

I. Handling BUM Traffic from a L2 Gateway a. Using PTEPs for Handling BUM Traffic from ToRs by IP Multicast As mentioned, in some embodiments, overlay logical networks use a defined multicast group to handle BUM traffic, namely, logical switches forward BUM traffic within the overlay to a multicast group of tunneling endpoints. However, some physical gateways are ToR (top of rack) switches that are unable to subscribe to a multicast group and unable to receive BUM traffic on a multicast group. Some embodiments therefore provide physical-network tunneling endpoints (PTEPs) for handling BUM traffic on behalf of the ToRs. PTEPs send BUM traffic that originate from a ToR to a multicast group for delivery to VMs and replicate the traffic on unicast VXLAN tunnels to all other ToRs that connect physical networks to the logical switch.

Figure 4:
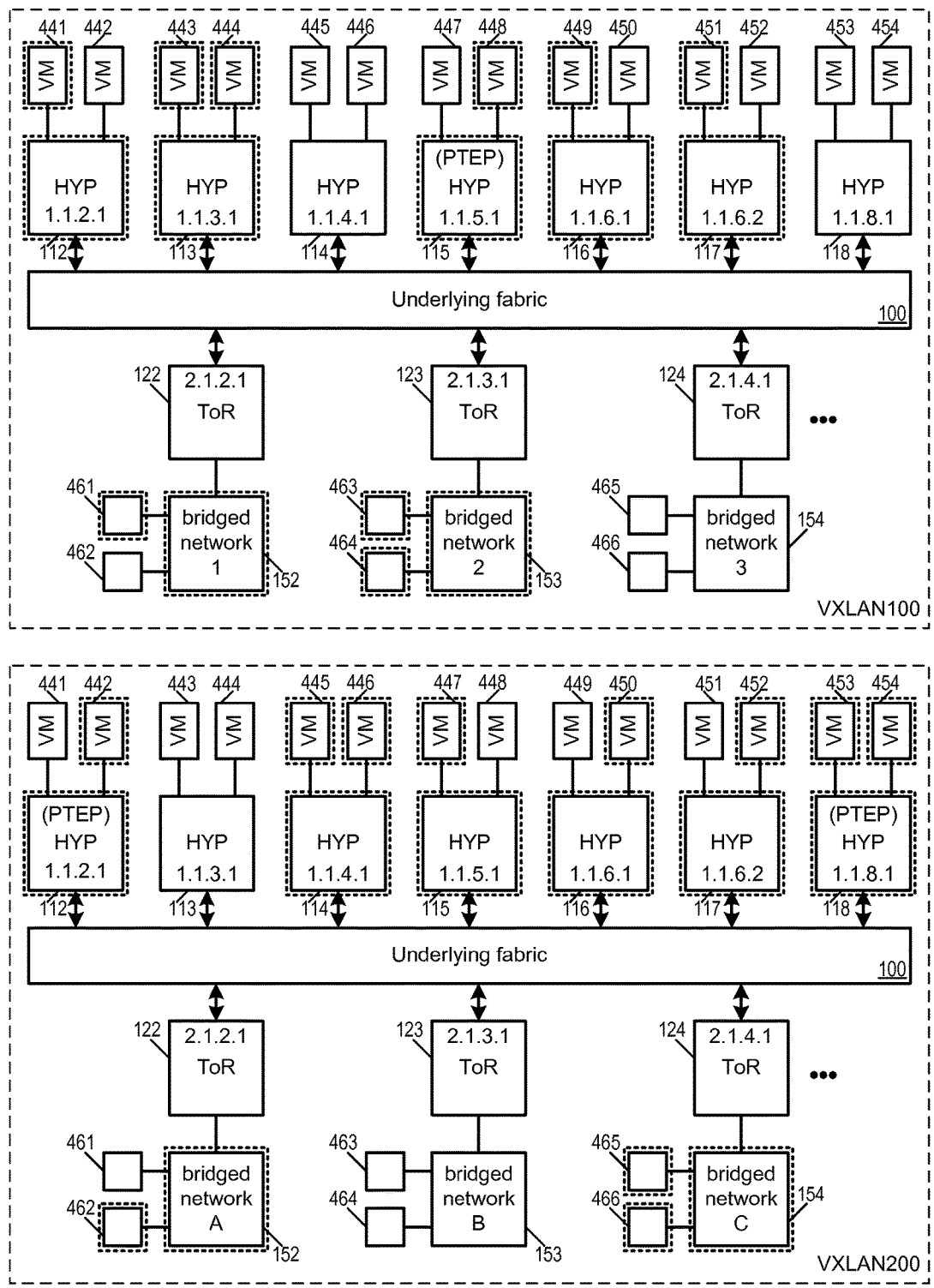
FIG. 4 illustrates different sets of PTEPs that are selected for different overlay logical networks sharing the same network virtualization infrastructure.

In some embodiments, a PTEP is a VTEP that is selected and configured to handle the BUM traffic from ToRs to an overlay logical network. In some embodiments, each overlay logical network has its corresponding set of PTEPs, and different logical networks can have different sets of PTEPs. FIG. 4 illustrates different sets of PTEPs that are selected for different overlay logical networks sharing the same network virtualization infrastructure 100. The network virtualization infrastructure 100 interconnects host machines 112-118, which hosts VMs 441-454. The network virtualization infrastructure is also connected to by ToRs 122-124, which bridges physical networks 152-154 into overlay logical networks operating in the infrastructure. The physical networks 152-154 includes network nodes 461-466.

As illustrated, two different overlay logical networks, VXLAN100 and VXLAN200, are both operating logical switches over the underlying fabric of the network virtualization infrastructure 100. Each of the overlay logical networks has its own set of VMs and network nodes in the bridged physical networks. Specifically, VXLAN100 has VMs 441, 443, 444, 448, 449, and 451. In addition, network nodes 461 behind the ToR 122 and network nodes 463 and 464 behind the ToR 123 are also bridged to VXLAN100. On the other hand, VXLAN200 has VMs 442, 445, 446, 447, 450, 452, 453, and 454, while network nodes 462 behind the ToR 122 and network nodes 465 and 466 behind the ToR 124 are bridged to VXLAN200.

Each host machine runs a hypervisor and hosts one or more of the VMs and serves as a VTEP for VXLAN100 and/or VXLAN200 based on the VMs it is hosting. A host machine subscribes to a particular multicast group if it hosts a VM in a corresponding overlay logical network. For example, the host machine 112 is hosting the VM 441 in VXLAN100 and the VM 442 in VXLAN200, the host machine of 112 therefore subscribes to a multicast group for VXLAN100 and another multicast group for VXLAN200. In contrast, the host machine 113 hosts only VMs 443-444 in VXLAN100, the host machine of 113 therefore subscribes to only multicast group of VXLAN100. Consequently, host machines 112, 113, 115, 116, 117 are members of the multicast group that corresponds to VXLAN100, while host machines 112, 114, 115, 116, 117, and 118 are members of the multicast group that corresponds to VXLAN200. Host machines 112, 115, 116, and 117 are members of both multicast groups because they host VMs for both logical switches. ToRs 122-124 are not members of any multicast group, though they are also assigned VTEP-IPs and serve as VTEPs.

Each overlay logical network has its own set of PTEPs. Specifically, the host machine 115 is selected as the PTEP for VXLAN100, while the host machines 112 and 118 are selected as PTEPs for VXLAN200. In some embodiments, the network controller selects host machines to serve as PTEPs in a manner that balances traffic load or computation load across different host machines. In some embodiments, each PTEP selected for a particular logical switch also hosts at least one VM for the particular logical switch (as illustrated in the example of FIG. 4). However, in some embodiments, a PTEP selected for an overlay logical network need not be a host machine that hosts any VMs in that particular overlay.

Figure 5:
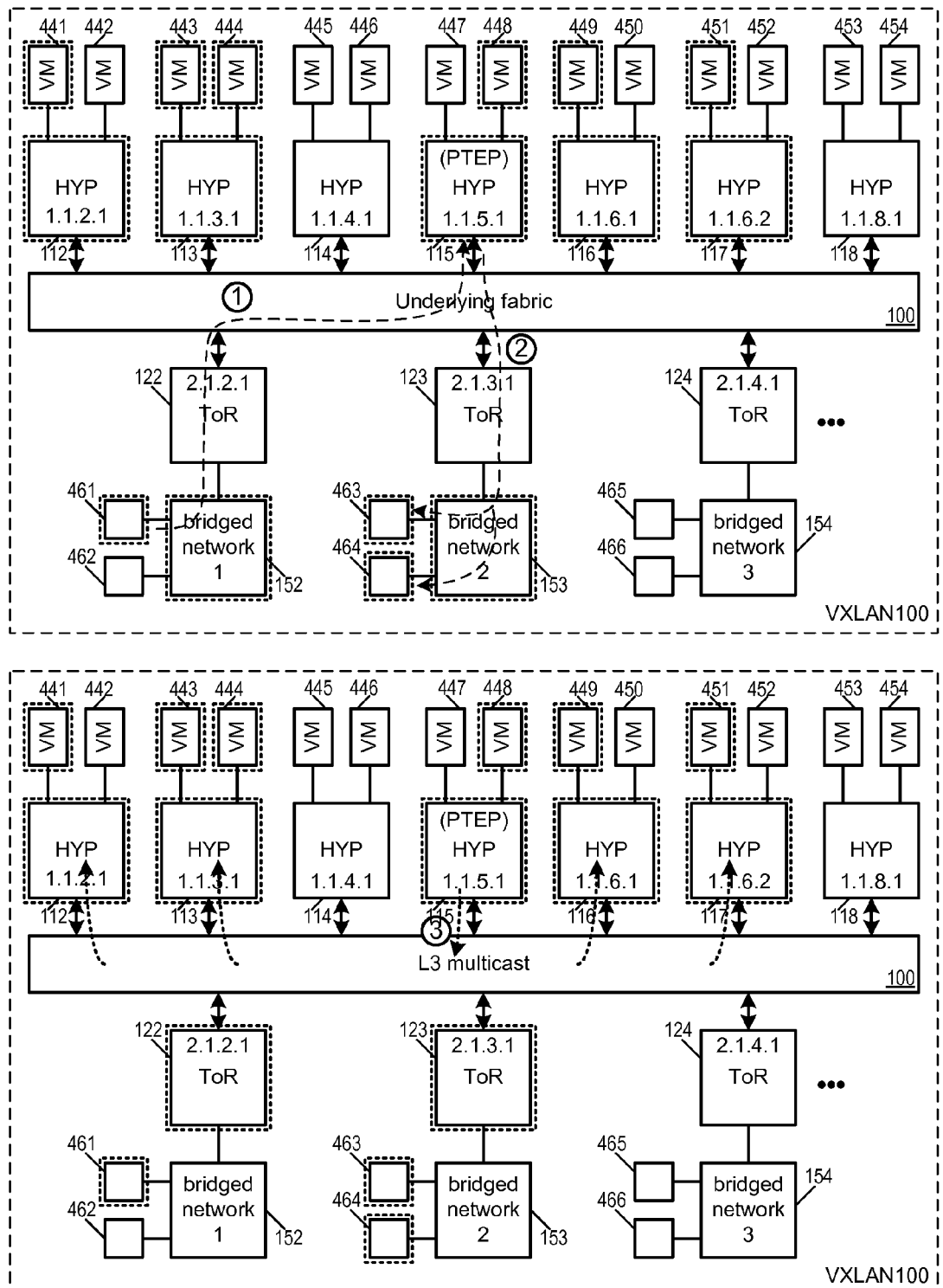
FIG. 5 illustrates using a PTEP to handle BUM traffic from a ToR.

FIG. 5 illustrates using a PTEP to handle BUM traffic from a ToR. Specifically, the figure illustrates how the PTEP 115 replicates BUM traffic from the ToR 122 to endpoints in VXLAN100 in operations labeled '1' to '3'. As illustrated, in operation '1', the network node 461 generates BUM traffic for VXLAN100 (entities connected to VXLAN100 are illustrated with dotted boxes) in the physical network 152, and the ToR 122 tunnels the traffic as unicast to the PTEP 115, using its tunneling IP 1.1.5.1 as destination. The PTEP 115 in operation '2' replicates the BUM traffic and tunnels the replicated traffic as unicast to the ToR 123 (using tunneling IP 2.1.3.1), which in turn forwards the traffic to the network nodes 463 and 464.

In operation '3', the PTEP 115 replicates the BUM traffic to VTEPs in the multicast group of VXLAN100. In this example, the underlying fabric of the network virtualization infrastructure 100 supports L3 multicast, so the PTEP 115 sends the BUM traffic as L3 multicast for the multicast group of VXLAN100. The multicast is received by host machines 112, 113, 116, and 117 as members of the multicast group. The VM 448, though also belonging to VXLAN100, receives the BUM traffic directly from the PTEP 115 as its host machine.

The overlay logical network VXLAN100 has only one PTEP, thus a ToR has only option for sending BUM traffic into VXLAN100. However, in some embodiments, an overlay logical network can have multiple PTEPs, and a ToR has multiple PTEPs to choose from for sending BUM traffic. As illustrated in FIG. 4, both host machines 112 and 118 are selected as PTEPs for the overlay logical network VXLAN200. Consequently, a ToR can choose either PTEP 112 or PTEP 118 for sending BUM traffic. Such choice can be based on load balancing algorithms.

Figure 6:
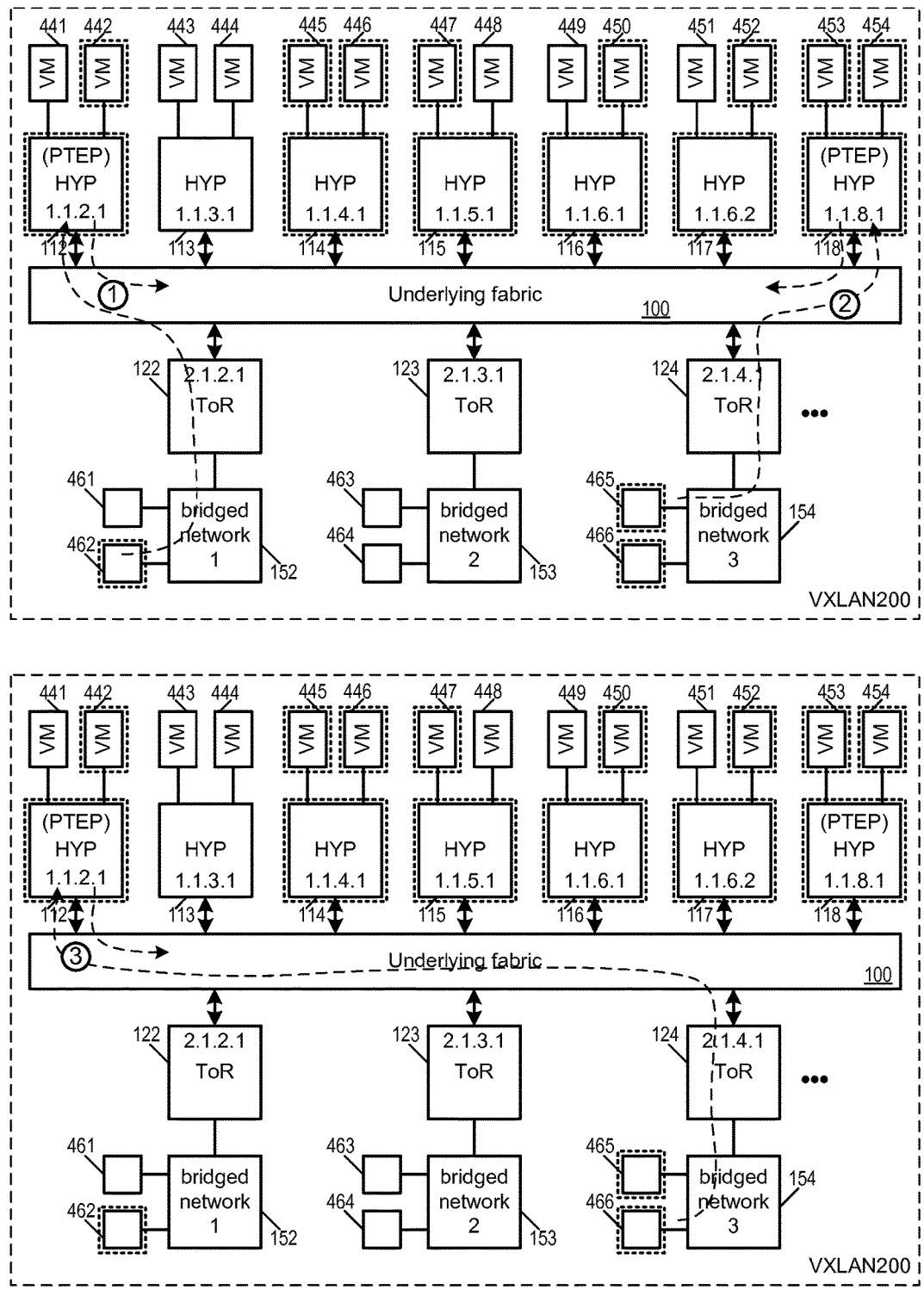
FIG. 6 illustrates using multiple PTEPs for sending BUM traffic from ToRs in an overlay logical network.

FIG. 6 illustrates using multiple PTEPs for sending BUM traffic from ToRs in the overlay logical network VXLAN200. The figure illustrates three operations labeled '1' to '3', each operation being a unicast tunneling from a ToR to one of the PTEPs of the logical overlay network VXLAN200 (entities connected to VXLAN200 are illustrated with dotted boxes). In operation '1', the ToR 122 chooses the PTEP 112 for sending its BUM traffic into VXLAN200. In operation '2', the ToR 124 chooses PTEP 118 for sending its BUM traffic into VXLAN200. In some embodiments, this choice is based on load balancing considerations, e.g., to try to avoid sending all BUM traffic through a same PTEP. In operation '3', the ToR 124 has more BUM traffic to send and chooses the PTEP 112 instead of the PTEP 118, this choice likewise based on load balancing considerations.

In the examples illustrated in FIG. 5, the underlying fabric of the network virtualization infrastructure support L3 multicast, and thus a PTEP is able to replicate BUM traffic onto endpoints in a multicast group by using IP multicast. Using IP multicast is very bandwidth efficient—source hypervisor or PTEP sends only one multicast packet which is replicated by underlying physical network to all hypervisors.

b. Using MTEPs as Multicast Proxy

In some embodiments, the underlying fabric does not support L3 multicast. Rather than letting the PTEP replicate traffic to each destination by unicast, some embodiments designates a set of host machines running hypervisors as multicast tunneling endpoints (MTEPs) to serve as multicast proxies. A PTEP in turn sends BUM traffic in unicast to these MTEPs and let the MTEPs complete the BUM traffic replication to each destination on its L2 segment.

In some embodiments, the underlying fabric supports L2 multicast within physical L2/link layer segments or multicast islands, though L3/IP multicast across different segments is not supported. Some of these embodiments designate one host machine as MTEP per L2 physical segment per logical switch. In other words, different overlay logical networks can have different sets of MTEPs. In some embodiments, the network controller selects host machines to serve as MTEPs in a manner that balances traffic load or computation load across different host machines.

Figure 7:
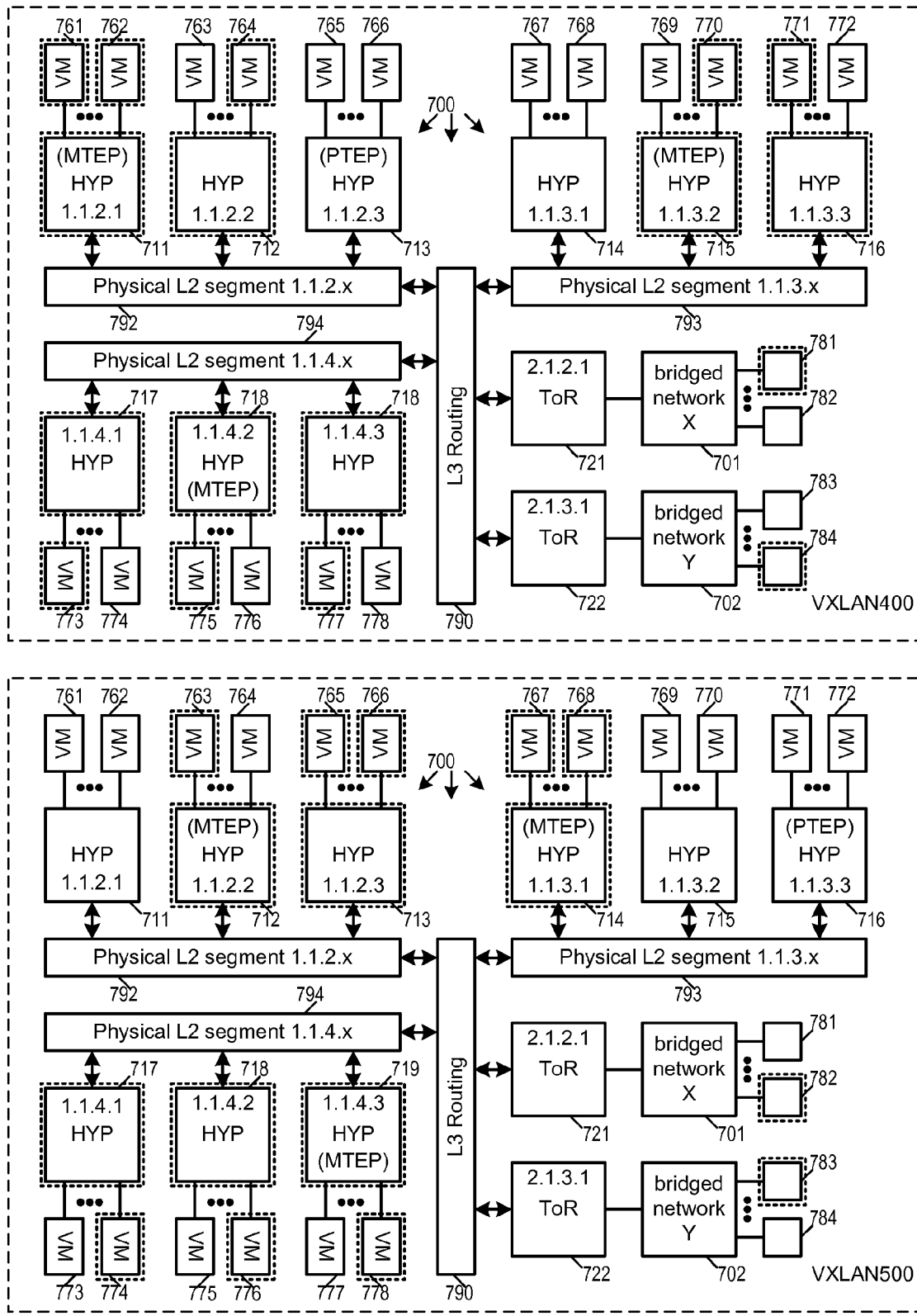
FIG. 7 illustrates a network virtualization infrastructure that is segmented into different L2 segments and does not support L3 multicast across different segments.

FIG. 7 illustrates a network virtualization infrastructure 700 that is segmented into different L2 segments and does not support L3 multicast across different segments. The network virtualization infrastructure 700 interconnects host machines 712-719, which hosts VMs 761-778. The network virtualization infrastructure also connects ToRs 721-722, which bridges physical networks 701-702 into overlay logical networks operating in the infrastructure. The physical network 701 includes network nodes 781-782 and the physical network 702 includes network nodes 783-784. Each host machine and each ToR is assigned a tunneling IP (VTEP-IP)

that is known by all other VTEPs (ToRs and host machines) controlled by a same network controller.

The network virtualization infrastructure 700 includes three physical L2 segments 792-794 that are interconnected by L3 routing fabric 790. The host machines 711-713 are connected to the infrastructure at the L2 segment 792, the host machines 714-716 are connected to the infrastructure at the L2 segment 793, and the host machines 717-719 are connected to the infrastructure at the L2 segment 794. Each physical L2 segment is a multicast island that allows L2 multicast within, but the interconnecting L3 routing fabric 790 does not allow IP multicast to cross between different L2 segments.

In some embodiments, each L2 segment corresponds to an IP subnet. In this example, the L2 segment 792 corresponds to IP subnet 1.1.2.x, the L2 segment 793 correspond to IP subnet 1.1.3.x, and the L2 segment 794 correspond to IP subnet 1.1.4.x. In some embodiments, multicast islands or L2 segments are not identified based on IP subnets, but are rather identified by segment coloring algorithms performed by host machines in the network. Segment coloring algorithms are used to determine the boundaries of L2 BUM traffic propagation. Segment coloring algorithms are described in U.S. patent application Ser. No. 14/133,524, titled "Connectivity Segment Coloring", filed on Dec. 18, 2013.

As illustrated, two different overlay logical networks VXLAN400 and VXLAN500 are operating logical switches over the underlying fabric of the network virtualization infrastructure 700. Each of the logical switches connects its own set of VMs. Specifically, VXLAN400 connects VMs 761, 762, 764, 770, 771, 773, 775, and 777 (surrounded by dots), while VXLAN500 connects VMs 763, 765, 766, 767, 768, 774, 776, and 778. In addition, the network nodes 781 behind the ToR 721 and the network nodes 784 behind the ToR 722 (surrounded by dot) are bridged to VXLAN400, while network nodes 782 behind the ToR 721 and network nodes 783 behind the ToR 722 are bridged to VXLAN500.

Each host machine hosts one or more of the VMs and serves as a VTEP for VXLAN400 and/or VXLAN500 based on the VMs it is hosting. Furthermore, each hypervisor connected to an overlay logical switch is a member of a multicast group that is used to handle the BUM traffic of the overlay logical switch. Consequently, host machines (i.e., their hypervisors) 711, 712, 715, 716, 717, 718, and 719 are members of the multicast group that corresponds to VXLAN400, while host machines 712, 713, 714, 717, 718, and 719 are members of the multicast group that corresponds to VXLAN500. Host machines 712, 717, 718, and 719 are members of both multicast groups because they host VMs for both logical switches. ToRs 721 and 722 are not members of any multicast group.

Each overlay logical network has its own set of PTEPs. Specifically, the host machine 713 is selected as a PTEP for VXLAN400, while the host machine 716 is selected as a PTEP for VXLAN500. Each overlay logical networks also has its own set of MTEPs, each MTEP for handling multicast traffic of one L2 segment. For VXLAN400, host machines 711, 715, and 718 are selected as the MTEPs of L2 segments 792, 793, and 794, respectively. For VXLAN500, host machines 712, 714, and 719 are selected as the MTEPs of L2 segments 792, 793, and 794, respectively. In this example, each MTEP selected for a particular logical switch also hosts at least one VM for the particular logical switch. However, in some embodiments, a MTEP selected for an overlay logical network need not be a host machine that hosts any VMs in that particular overlay. Also, in this example, none of the host machines selected to be a MTEP is also selected to be a PTEP. However, in some embodiments, a host machine can be selected to be a PTEP and a MTEP for a same logical switch.

Figure 8:
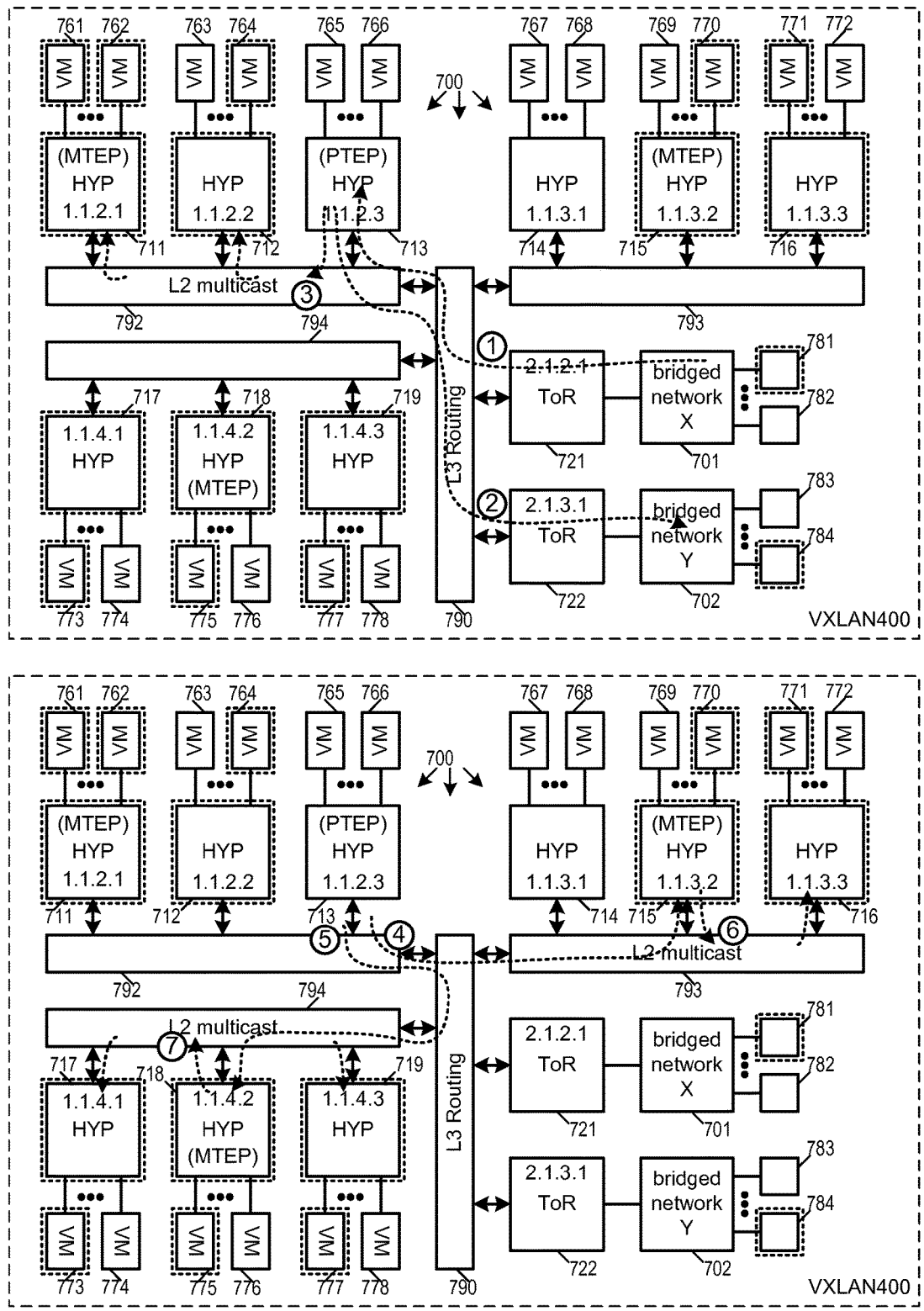
FIG. 8 illustrates using PTEPs and MTEPs to perform replication for BUM traffic originates from a ToR.

FIG. 8 illustrates using PTEPs and MTEPs to perform replication for BUM traffic originates from a ToR. Specifically, in seven operations labeled '1' to '7', FIG. 8 illustrates the replication of BUM traffic from the ToR 721 by using the selected PTEP and MTEPs for VXLAN400. At operation '1', the network node 781 generates BUM traffic for VXLAN400 in the physical network 702, and the ToR 721 tunnels the traffic as unicast to the PTEP 713 (PTEP of VXLAN400) by using its tunneling IP 1.1.2.3. The PTEP 713 in operation '2' replicates the BUM traffic and tunnels the replicated traffic as unicast to the ToR 722 (by using its tunneling IP 2.1.3.1), which in turn forwards the traffic to the network node 784.

At operation '3', the PTEP 713 replicates the BUM traffic to other VXLAN400 endpoints in the segment 792 (i.e., hypervisors in host machines 711 and 712). Since the segment 729 supports L2 multicast, the PTEP 713 is configured to replicate the BUM traffic by utilizing the L2 multicast capabilities of the segment 792. In some embodiments, this is done by using IP multicast for the multicast group of VXLAN400 with an IP TTL of 1, which allows the multicast traffic to reach all endpoints of VXLAN400 in segment 792 but not beyond. The MTEP 711 is on the same segment 792 as the PTEP 713, so it does not have to perform replication when the ToR uses the PTEP 713 to send BUM traffic.

At operation '4', the PTEP 713 tunnels the BUM traffic as unicast to the MTEP 715 of the segment 793. Likewise, at operation '5', the PTEP 713 tunnels the BUM traffic as unicast to the MTEP 718 of the segment 794. As a result, the MTEPs in segments 793 and 794 have the replicated BUM traffic, and can each independently replicate the BUM traffic in each's respective L2 segment.

At operation '6', the MTEP 715 replicates the BUM traffic to other VXLAN400 endpoints in the segment 793 (i.e., VTEP in 716). Likewise, at operation '7', the MTEP 718 replicates the BUM traffic to other VXLAN400 endpoints in the segment 794 (i.e., VTEPs in 717 and 719). Since both segments 793 and 794 support L2 multicast, the MTEPs in those segments are able to replicate the BUM traffic by using L2 multicast capabilities of those segments.

Figure 9:
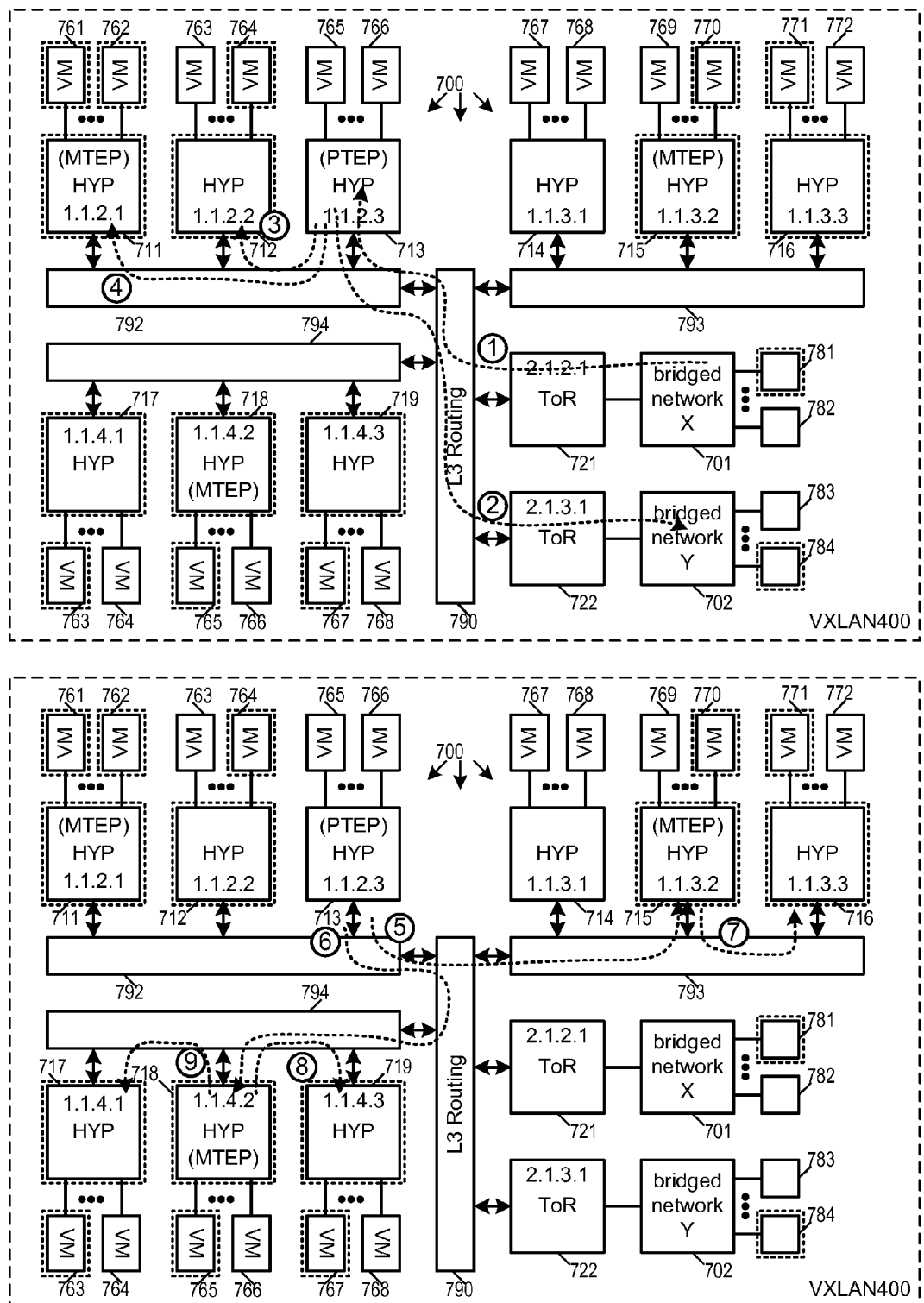
FIG. 9 illustrates MTEPs that are configured to replicate BUM traffic in L2 segments by unicast rather than by multicast.

FIG. 8 illustrates a network virtualization infrastructure in which every L2 segment support L2 multicast. Using MTEP proxies to leverage L2 multicast capabilities on each L2 segment makes efficient use of bandwidth on each L2 segment. However, some network virtualization infrastructure have L2 segments that do not support L2 multicast, while some other network virtualization infrastructure do not support any type of multicast. In some embodiments, therefore, a MTEP of a segment can be configured to use unicast to replicate BUM traffic to other endpoints of its segment. FIG. 9 illustrates MTEPs that are configured to replicate BUM traffic in L2 segments by unicast rather than by multicast. In the example of FIG. 9, the MTEPs (as well as the PTEP) of VXLAN400 are configured to replicate BUM traffic by unicast rather than by multicast. Though doing so creates one packet per receiving hypervisor on the destination L2 segment, it still more bandwidth efficient than replication at the source hypervisor to each destination hypervisor by unicast.

In nine operations labeled '1' through '9', FIG. 9 illustrates the replication of BUM traffic from the ToR 721 by using the selected PTEP (713) and MTEPs (711, 715, and 718) for VXLAN400 in which the replications use only unicast. At operation '1', the network node 781 generates BUM traffic for VXLAN400 in the physical network 702, and the ToR 721 tunnels the traffic as unicast to the PTEP 713. The PTEP 713 in operation '2' replicates the BUM traffic and tunnels the replicated traffic as unicast to the ToR 722, which in turn forwards the traffic to the network node 784.

At operation '3', the PTEP 713 replicates the BUM traffic to the host machine 712 by unicast tunneling to 1.1.2.2. At operation '4', the PTEP 713 replicates the BUM traffic to the host machine 711 by unicast tunneling to 1.1.2.1. VTEPs in 711 and 712 are both endpoints in the VXLAN400 multicast group, but the replication operations of the PTEP 713 do not rely on multicast capabilities of the L2 segment 792.

At operation '5', the PTEP 713 tunnels the BUM traffic as unicast to the MTEP 715 (tunneling IP 1.1.3.2) of the segment 793. Likewise, at operation '6', the PTEP 713 tunnels the BUM traffic as unicast to the MTEP 718 (tunneling IP 1.1.4.2) of the segment 794. As a result, the MTEPs in segments 793 and 794 have the replicated BUM traffic, and can each independently replicate the BUM traffic each's respective L2 segment.

At operation '7', the MTEP 715 replicates the BUM traffic to the host machine in 716 by unicast tunneling to 1.1.3.3 (i.e., using 1.1.3.3 as destination IP address rather than multicast IP). At operation '8', the MTEP 718 replicates the BUM traffic to the host machine in 719 by unicast tunneling to 1.1.4.3 (i.e., using 1.1.4.3 as destination IP address rather than multicast IP). At operation '9', the MTEP 718 replicates the BUM traffic to the host machine in 717 by unicast tunneling to 1.1.4.1 (i.e., using 1.1.4.1 as destination IP address rather than multicast IP).

In the example of FIG. 9, all of the MTEPs are configured the same, i.e., either all of the MTEPs are configured to perform replication by unicast or all of the MTEPs are configured to perform replication by multicast. In some embodiments, each MTEP can be independently configured to replicate by multicast or unicast so to best utilize the L2 multicast capability of each of the segments. In some embodiments, MTEPs are configured on a per logical switch basis.

II. Programming Endpoints for BUM Traffic

Figure 10:
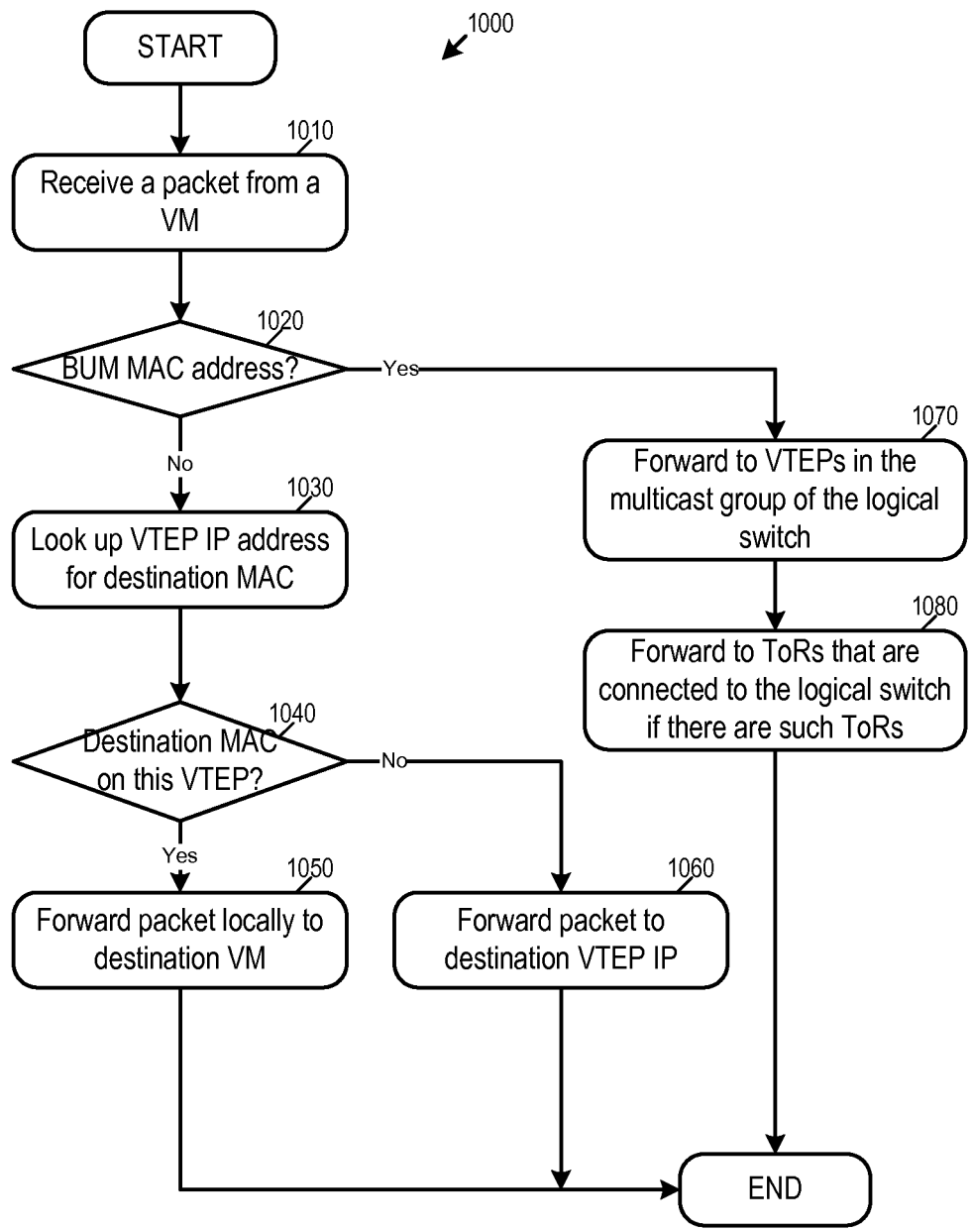
FIG. 10 conceptually illustrates a process performed by a hypervisor when BUM traffic comes from a VM of its host machine.

As discussed above, a host machine running a hypervisor connected to a logical switch/overlay logical network such VXLAN is a tunnel endpoint (VTEPs) for the logical switch. Furthermore, the host machine can be further configured to act as a PTEP and/or a MTEP for handling BUM traffic. For some embodiments, FIG. 10 conceptually illustrates a process 1000 performed by a host machine when BUM traffic comes from a VM of its host machine.

The process 1000 starts when it receives (at 1010) a packet from the VM. The process then determines (at 1020) whether the destination MAC address of the packet is BUM traffic. Namely, the process examines the destination MAC address to see if it's for broadcast (e.g., ffffffffffff), a known multicast MAC address, or an unknown unicast address that requires flooding to all endpoints in the logical switch. If the destination MAC address is a BUM address, the process proceeds to 1070. If the destination is a known unicast MAC address, the process proceeds to 1030.

At 1030, the process looks up the VTEP (or tunneling) IP address for the destination MAC address. The mapping between a MAC address and a VTEP IP address is provided by the network controller as bindings <MAC, VTEP-IP, logical switch> in some embodiments.

Once the process has mapped the destination MAC address to its corresponding destination VTEP IP address, the process determines (at 1040) whether the MAC address is for a VM being hosted by the host machine of this VTEP, i.e., if the mapped destination VTEP-IP is the VTEP-IP of this host machine. If so, the process proceeds to 1050 to forward the packet locally to the destination VM. If the destination VM is on another host machine (i.e., the VTEP-IP is that of another VTEP), the process proceeds to 1060 to tunnel packet to the VTEP with the destination VTEP IP address. As discussed by reference to FIG. 2 above, such a destination VTEP can be a ToR or a physical gateway for a physical network. The process 1000 ends after the packet is forwarded to its destination.

At 1070, the process has determined that the MAC address is for BUM traffic and forwards the packet to all other VTEPs connected to the logical switch. In some embodiments, VTEPs connected to a logical switch are in a multicast group for handling the BUM traffic of that logical switch. In some embodiments, such BUM traffic is forwarded by unicast tunneling to one or more multicast proxies (e.g., MTEP) that in turn forward the BUM traffic to all endpoints of the multicast group, whether by unicast or multicast. If the traffic is to be sent to a MTEP to be replicated, some embodiments mark the outgoing packet as requiring proxy replication so the MTEP would know to replicate the packet further and not merely treat it as a packet destined for one of its VMs.

Next, the process forwards (at 1080) the BUM traffic to ToRs that are connected to the logical switch, if such ToRs exist. In some embodiments, the process 1000 determines whether there are ToRs connected to a particular logical switch by examining information forwarded to it by the network controller, which relays the VTEP-IPs of ToRs to each of the VTEPs. If there are ToRs connected to the logical switch, the process forwards the BUM traffic to each of the ToRs by unicast since ToRs cannot subscribe to multicast group to receive multicast traffic. The unicast tunneling of BUM traffic from a host machine hypervisor to a ToR is discussed by reference to FIG. 3b above. The process 1000 then ends.

Figure 11:
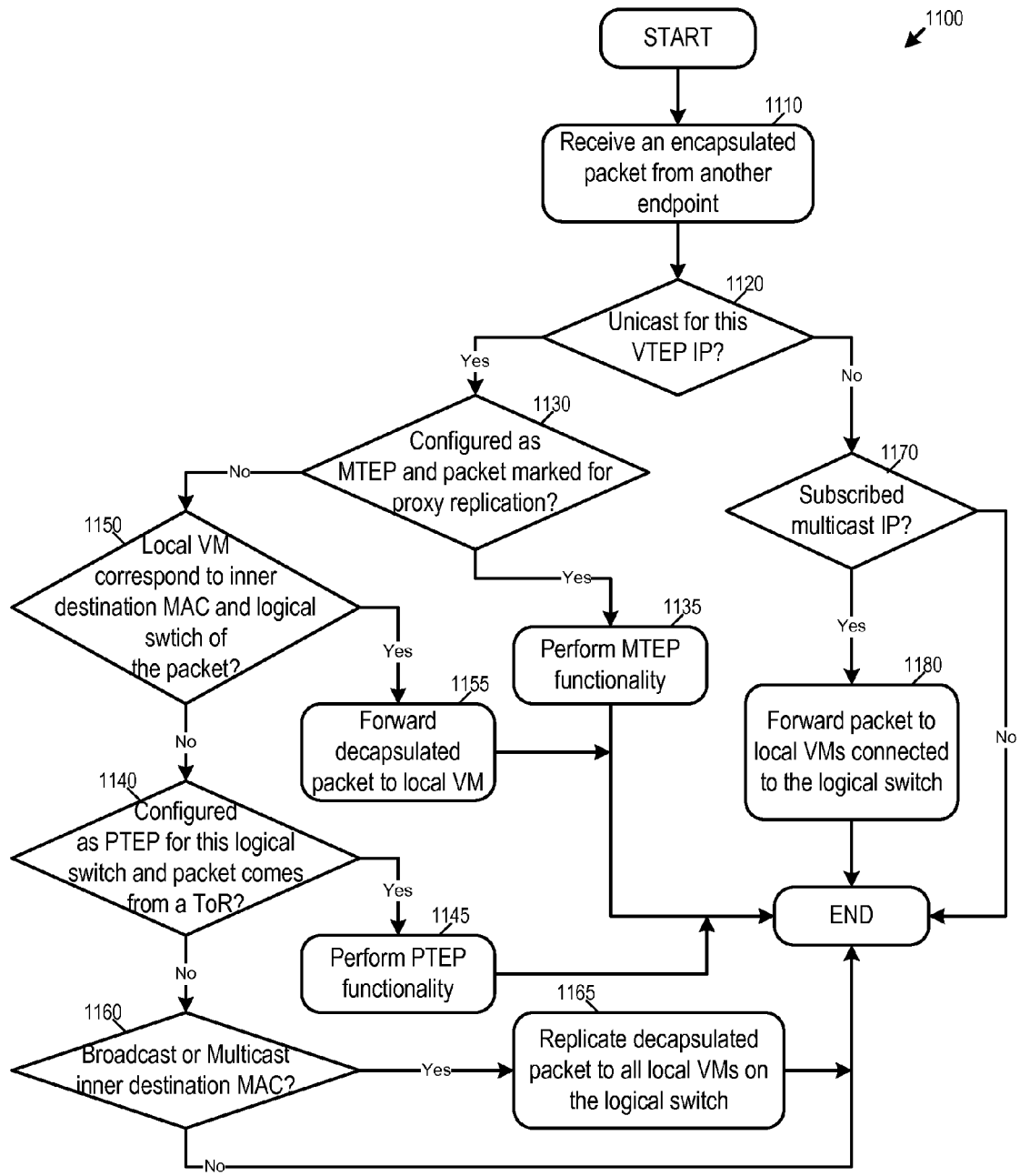
FIG. 11 conceptually illustrates a process performed by a hypervisor for processing traffic from the network (i.e., from the NIC and not from one of its own VMs).

For some embodiments, FIG. 11 conceptually illustrates a process 1100 performed by a host machine for processing traffic from the network (i.e., from the NIC and not from one of its own VMs). The host machine can be further configured to perform the functions of a PTEP and/or a MTEP. The process 1100 starts when it receives (at 1110) a tunnel encapsulated packet from another endpoint connected to a logical switch.

The process then determines (at 1120) if the received packet is tunneled to this host machine by unicast, and whether the destination IP address is the VTEP-IP of this host machine. If the received packet is tunneled to this VTEP-IP by unicast, the process proceeds to 1130. If the destination IP address is not the VTEP-IP of this host machine, the process proceeds to 1170. It is worth noting that such a packet, even if arrived at this host machine/VTEP by unicast tunneling, its encapsulated inner content may still be BUM traffic destined to all VTEPs connected to a particular logical switch.

At 1170, the process determines whether the packet is for a multicast group that includes this host machine, i.e., if destination IP address of the packet is a multicast IP subscribed to by this host machine. If so, the process forwards (at 1180) the packet to all local VMs that are connected to the corresponding logical switch. The process 1100 then ends.

At 1130, the process determines whether this host machine is configured as a MTEP for this logical switch and if the receive packet is marked for proxy replication. In some embodiments, this marking is a flag set in the outer header of the packet to indicate that the packet is not just for a local VM but also for replication to other endpoints. If the host machine is configured as a MTEP, it proceeds to 1135. Otherwise the process proceeds to 1150.

At 1135, the process performs the functions of a MTEP by of replicating packets to endpoints belonging to the multicast group of the logical switch in the same L2 segment. This operation will be further described by reference to a process 1202 in FIG. 12 below. After performing MTEP functionality, the process 1100 ends.

At 1150, the process determines whether the destination MAC address is that of a local VM, and whether the local VM is connected to the logical switch specified in the packet. The process at this operation has received a packet that is tunneled to this host machine by unicast. In some embodiments, the destination MAC address is specified in the inner header and the logical switch is specified by the VNI in the outer header. If the destination MAC address is that of a local VM and the local VM is connected to the logical switch specified in the packet, the process proceeds to 1155. Otherwise, the process proceeds to 1140.

At 1155, the process removes the outer encapsulation and forwards the decapsulated packet to the local VM that is connected to the logical switch specified in the packet. The process 1100 then ends.

At 1140, the process determines whether this host machine is configured as a PTEP for this logical switch (as indicated by the VNI in the outer header of the received packet) and if the packet comes from a ToR. If the process is to perform the functions of a PTEP, then it proceeds to 1145. Otherwise, the process proceeds to 1160.

At 1145, the process performs PTEP functionality by replicating the packet to endpoints belonging to the multicast group of the logical switch. The process also replicates the packet to other ToRs (which cannot be in a multicast group) that are bridging network nodes to the logical switch. This operation will be further described by reference to a process 1201 in FIG. 12 below. After performing the PTEP functionality, the process 1100 ends.

At 1160, the process determines if the inner destination MAC address is that of broadcast traffic (e.g., ffffffff), multicast traffic, or unknown unicast (i.e., BUM). If the inner destination MAC address is not for BUM traffic, the process 1100 ends. If the destination MAC address is for BUM traffic, the process proceeds to 1165 to replicate the packet to all VMs on the logical switch (as specified by the VNI in the outer header) and ends.

Figure 12:
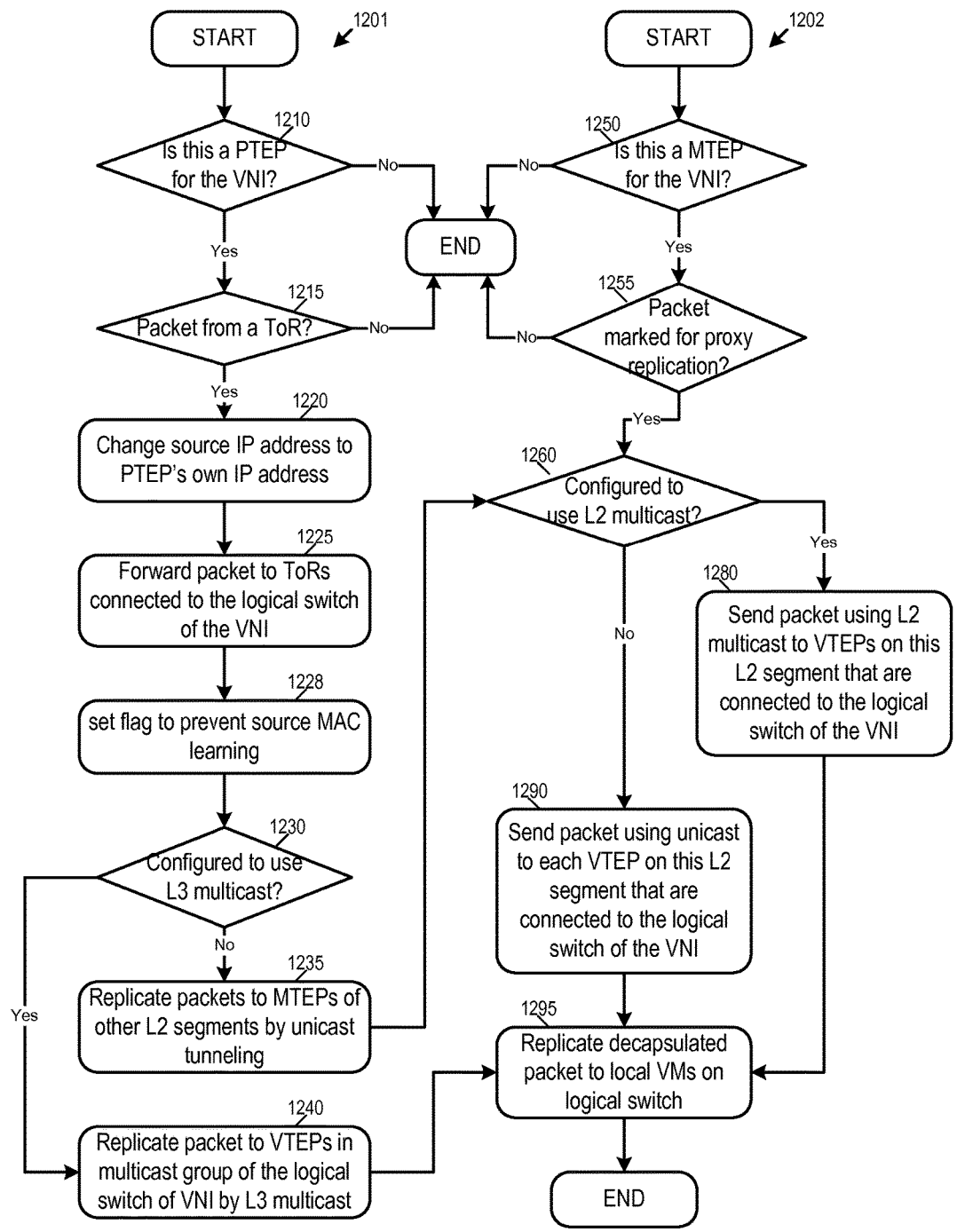
FIG. 12 conceptually illustrates a first process performed by a hypervisor if the hypervisor is configured as a PTEP and a second process if the hypervisor is configured as a MTEP.

FIG. 12 conceptually illustrates two processes 1201 and 1202 that are performed during the process 1100 in some embodiments. Specifically, the process 1201 is performed by the host machine during the operation 1145 if the host machine is configured as a PTEP, and the process 1202 is performed by the host machine during the operation 1135 if the host machine is configured as a MTEP. Both of processes 1201 and 1202 start after the host machine has received a unicast encapsulated packet destined for the VTEP-IP address of this host machine. Such an encapsulated packet can have BUM traffic as inner content that is destined to all endpoints of a logical switch.

The process 1201 starts by determining (at 1210) whether the host machine is selected and configured as a PTEP for the logical switch of packet. In some embodiments, the logical switch of the packet is indicated by the overlay logical network identifier field (e.g., VNI) in the outer header of the encapsulated packet. If this host machine has been selected as the PTEP of logical switch as indicated by the VNI, the process proceeds to 1215. Otherwise, the process ends.

The process determines (at 1215) whether the received packet comes from a ToR (or physical gateway). As mentioned, every VTEP knows the tunneling IP of every other VTEP, and which tunneling IP belongs to a ToR. The process is thus able to determine whether the packet comes from a ToR by examining the source IP of the received packet. If the packet does not come from a ToR, the host machine will not behave as a PTEP, even if configured as one for this logical switch. The process 1201 therefore ends. On the other hand, if the packet does come from a ToR, the process proceeds to 1220.

At 1220, the process replaces the source IP address to the PTEP's own (i.e., the host machines own) tunneling IP address. Though this packet comes from a ToR and carries the ToR's tunneling address as the source IP address, the process in some embodiments replaces ToR's IP address with its own before replicating the packet to other endpoints.

The process next forwards (at 1225) the packet to ToRs connected to the logical switch of the VNI (except for the ToR that originates the packet). In some embodiments, this forwarding is accomplished by unicast tunneling to each of the ToRs. The unicast tunneling from PTEP to ToRs is described by reference to FIG. 3a above. As mentioned, VLANs in the physical network are mapped to logical switches of overlay logical networks, and VTEPs knows the MAC addresses behind each ToR and their corresponding VLAN. The host machine therefore knows which ToR is connected to the logical switch of the packet's VNI.

After forwarding the packet to other ToRs, the process marks (at 1228) the packet (e.g., by setting a flag in the packet header) to prevent source MAC learning by recipients of forwarded packet. This is done in some embodiments so to pass Reverse Path Forwarding (RPF) checks in the physical fabric since the PTEP is not the true source of the packet.

Next, the process 1201 acting as a PTEP determines (at 1230) whether it is configured to use L3 multicast. As mentioned, some network virtualization infrastructure support L3 multicast while other do not. Some embodiments therefore configure a host machine to use L3 multicast (or not). If the PTEP is not configured to use L3 multicast, the process proceeds to 1235. If PTEP is configured to use L3 multicast, the process replicates (at 1240) the packet to the multicast group of the logic switch (as indicated by VNI) by using L3 IP multicast. Using L3 multicast to transmit packet is described above by reference to FIG. 5. The process 1201 then proceeds to 1295.

At 1235, the process replicates the packet to the MTEPs of the overlay logic network. Specifically, the process tunnels the packet by unicast to each L2 segment's MTEP. The MTEPs will in turn act as the multicast proxy for this PTEP and replicate the packet to all of the endpoints connected to the logic switch in its L2 segment. In some embodiments, the PTEP would not send the packet to the MTEP of its own L2 segment, since PTEP would replicate the packet to the endpoints in its own segment by itself. In order to inform the host machine that receives the replicated packet to act as a MTEP and not merely as an ordinary VTEP, the process would mark the packet as requiring multicast proxy replication so the receiving VTEP would know to act as MTEP and not merely to accept the packet for its own VM. The process then proceeds to 1260 to replicate the packet to endpoints at the same L2 segment as the PTEP.

Operations 1260, 1280, 1290, and 1295 are performed by both the process 1201 and the process 1202 and will be described below.

The process 1202 starts by determining (at 1250) whether the host machine is selected and configured as a MTEP for the logical switch of packet (as indicated by the packet's VNI). If this host machine has been selected as the MTEP of logical switch as indicated by the VNI, the process proceeds to 1255. Otherwise, the process ends.

At 1255, the process determines whether the host machine should behave as a MTEP and perform replication as a multicast proxy. In some embodiments, this determination is made based on whether the packet is marked as requiring MTEP replication (e.g., by a flag in the packet header). In some embodiments, the process would observe whether the destination MAC address is for BUM traffic and determine whether the received packet requires further replication to other endpoints in the MTEP's own L2 segment. If this host machine is not required to act as a MTEP, the process 1202 ends. Otherwise, the process proceeds to 1260 to replicate the packet to endpoints at the same L2 segment as this host machine (i.e., the MTEP).

At 1260, the process (1201 or 1202) determines whether the host machine (whether as a MTEP or a PTEP) is configured to use L2 multicast. As mentioned, some network virtualization infrastructure are divided into physical L2 segments, where some or all of the segments are multicast island that support L2 multicast, while some other network virtualization infrastructure have physical L2 segments that do not support L2 multicast. Some embodiments therefore configure a host machine to use L2 multicast (or not). If the host machine is configured to use L2 multicast, the process proceeds to 1280 to replicate the packet to other endpoints on the same physical L2 segment connected to the VNI by using L2 multicast. If the host machine is not configured to use L2 multicast, the process proceeds to 1290 to replicate the packet to each of the other endpoints on the physical L2 segment by unicast. After replicating the packet either by L2 multicast or by unicast, the process 1201 (or 1202) proceeds to 1295. Replication of packet in physical L2 segments is further described by reference to FIGS. 8-9 above.

At 1295, the process removes the outer encapsulation and replicates the decapsulated packet to local VMs on the logical switch (i.e., as indicated by the VNI of the packet). The process 1201 (or 1202) then ends.

In some embodiments, in order for a host machine to function as a VTEP, PTEP, or MTEP, the host machine requires at least the following information: its own tunneling IP (or VTEP-IP), the tunneling IP of all VTEPs on the network, the MAC addresses of network nodes and the logical switches they are connected to, and the identities of MTEPs, PTEPs, and ToRs. In some embodiments, these pieces of information are programmed into each VTEP by the network controller. In some embodiments, MAC addresses in physical networks are learned by ToRs bridging those physical networks, and the network controller collects the learned MAC addresses and distributes them to each of the VTEPs (hypervisors and ToRs).

Figure 13:
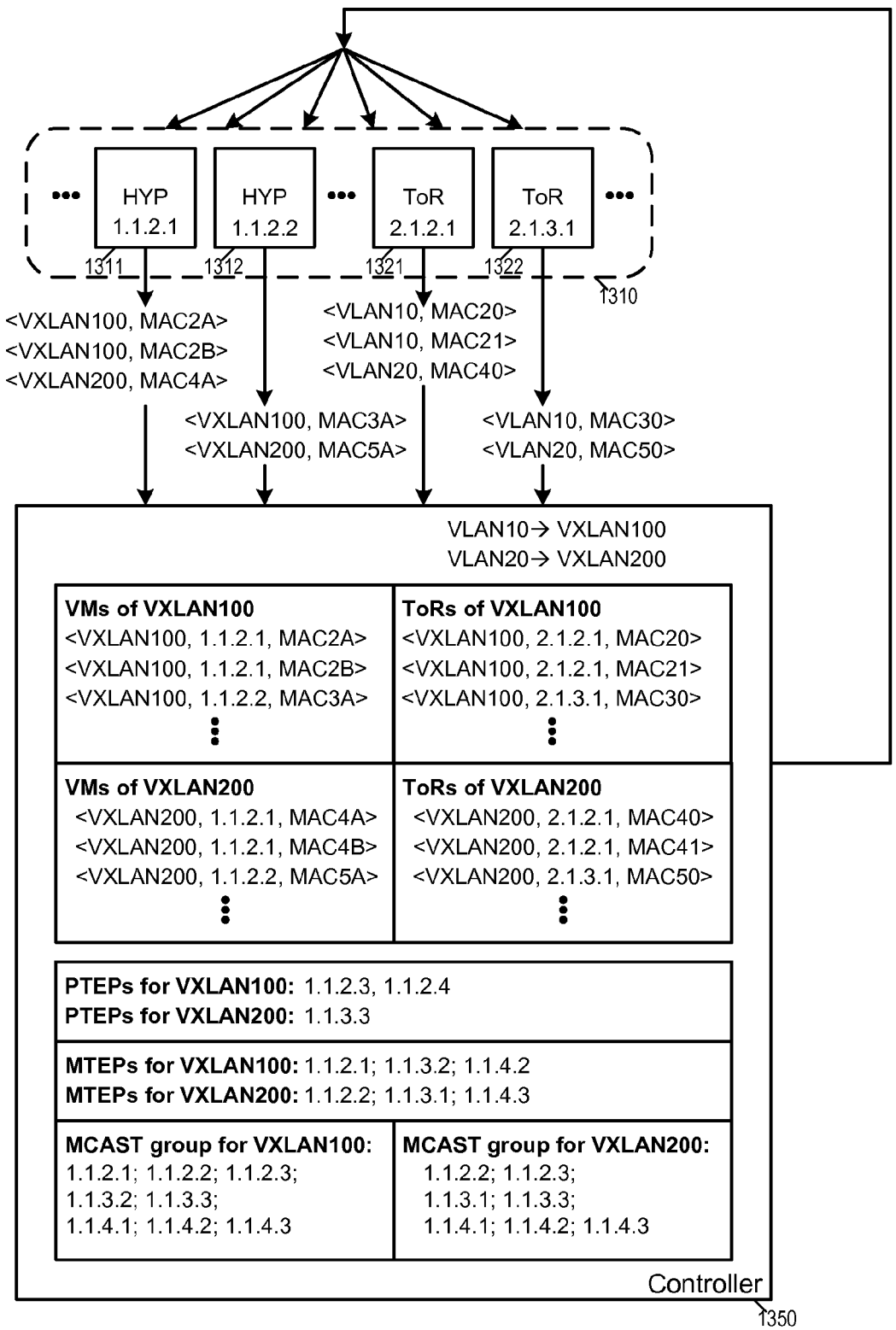
FIG. 13 conceptually illustrates the collection and distribution of configuration information for hypervisors, PTEPs, and MTEPs.

For some embodiments, FIG. 13 conceptually illustrates the collection and distribution of configuration information for VTEPs, PTEPs, and MTEPs. Specifically, the figure illustrates the collection of MAC addresses from tunnel endpoints 1310 of a network virtualization infrastructure 1300. The information is collected by a network controller 1350, which in turn distributes the information to all of tunneling endpoints 1310 connected to the network virtualization infrastructure 1300. The network virtualization infrastructure 1300 is operating logical switches of overlay logical networks VXLAN100 and VXLAN200. The tunnel endpoints include both host machines of VMs and physical gateways (or ToRs) of physical networks. The host machines are also VTEPs of the VXLANs. The ToRs serve as bridges for the physical networks (not illustrated) that include network domains VLAN10 and VLAN20. The ToRs bridge traffic from the physical networks to the overlay logical networks by acting as endpoints of the overlay logical networks.

As illustrated, several tunnel endpoints are connected to the network virtualization infrastructure 1300, including hypervisor 1311, hypervisor 1312, ToR 1321, and ToR 1322. Each hypervisor and ToR is assigned a unique tunneling IP within the network. A tunneling IP of a hypervisor (or ToR) is used by all logical switches it connects (i.e., both VXLAN100 and VXLAN200). The controller keeps track of multicast groups that correspond to the overlay logical networks. As illustrated, there is a multicast group for VXLAN100 and a multicast group for VXLAN200. A multicast group of an overlay logical network is subscribed to by endpoints connected to the corresponding logical switch. Members of the multicast group for VXLAN100 can receive traffic addressed to the multicast group of VXLAN100. Likewise for members of the multicast group for VXLAN200. However, in some embodiments, ToRs cannot subscribe to multicast groups.

FIG. 13 illustrates both the collection of data from the hypervisors and ToRs as well as the programming of the hypervisors and ToRs by the network controller 1350. The ToRs 1321 and 1322 learn the MAC addresses of network nodes operating in VLAN10 and VLAN20 from the bridged physical networks. The network controller 1350 collects these MAC addresses and their corresponding domains (e.g., VLAN10 or VLAN20) from the database (e.g., OVSDB) of the ToRs 1321 and 1322. The network controller 1350 then maps each domain operating in the bridged physical networks to one of the overlay logical networks. In the example of FIG. 13, the domain VLAN10 is bridged with the logical switch of VXLAN100, while the domain VLAN20 is bridged with the logical switch of VXLAN200. Consequently, for each of those collected MACs behind the ToRs, a corresponding binding of <logical switch, VTEP-IP, MAC address> is created, VTEP-IP being the tunneling IP assigned to the ToR that bridges the MAC address. For example, the ToR 1321 is bridging a network node having a MAC address "MAC40". The network node is connected to the domain "VLAN20", which is being bridged with overlay logical network "VXLAN200". The information is collected from the ToR 1321 by the network controller 1350 and results in a binding of <VXLAN200, 2.1.2.1, MAC40>, 2.1.2.1 being the VTEP-IP of the ToR 1321.

Likewise, the MAC addresses of VMs behind host machines 1311 and 1312 are collected by the controller 1350. The identity of the logical switches (i.e., the logical overlay network) connected to by those VMs are also collected. Consequently, for each of those collected VMs, a corresponding binding of <logical switch, VTEP-IP, MAC address> is created, VTEP-IP being tunneling IP of the host machine of the VM. For example, the host machine 1311 is operating a VM with MAC address "MAC2A". The VM is connected to the logical switch of the overlay logical network "VXLAN100". The information is collected from the host machine 1311 by the network controller 1350 and results in a binding of <VXLAN100, 1.1.2.1, MAC2A>, 1.1.2.1 being the VTEP-IP of the host machine 1311.

As illustrated, these created bindings are then distributed to all VTEPs (hypervisors and ToRs) connected to the network virtualization infrastructure so that the identities of the MAC addresses and their associated tunneling IP are known by all of the VTEPs. Furthermore, in some embodiments, the network controller also identifies which tunnel IPs as belonging to ToRs (2.1.2.1 and 2.1.3.1 in this example). This is so the VTEPs (such as a VTEP that is configured as PTEP) will be able to distinguish tunnels from endpoints that are ToRs versus tunnels from other VTEPs (e.g., host machine running hypervisors).

The controller 1350 also programs other information into tunneling endpoints. As illustrated, the controller identifies the tunneling IP of endpoints that have been selected as PTEPs and MTEPs. This serves to inform ToRs which endpoints have been selected as the PTEPs of a particular logical switch so the ToRs can tunnel BUM traffic to. This also serves to inform the PTEPs which endpoints have been selected as MTEPs of a particular logical switch so the PTEPs can forward BUM traffic to those MTEPs as multicast proxies. A ToR receiving this information from the controller 1350 would know that, for example, in order to send BUM traffic for a network node on VLAN10, it would have to send the BUM traffic by unicast tunnel to either 1.1.2.3 or 1.1.2.4, since 1.1.2.3 and 1.1.2.4 are the PTEPs of the logical switch of VXLAN100. The VTEPs with tunneling IP 1.1.2.3 or 1.1.2.4 as PTEPs in turns knows that 1.1.2.1, 1.1.3.2, and 1.1.4.2 are the MTEPs of the logical switch for VXLAN100.

III. Software Architecture

Figure 14:
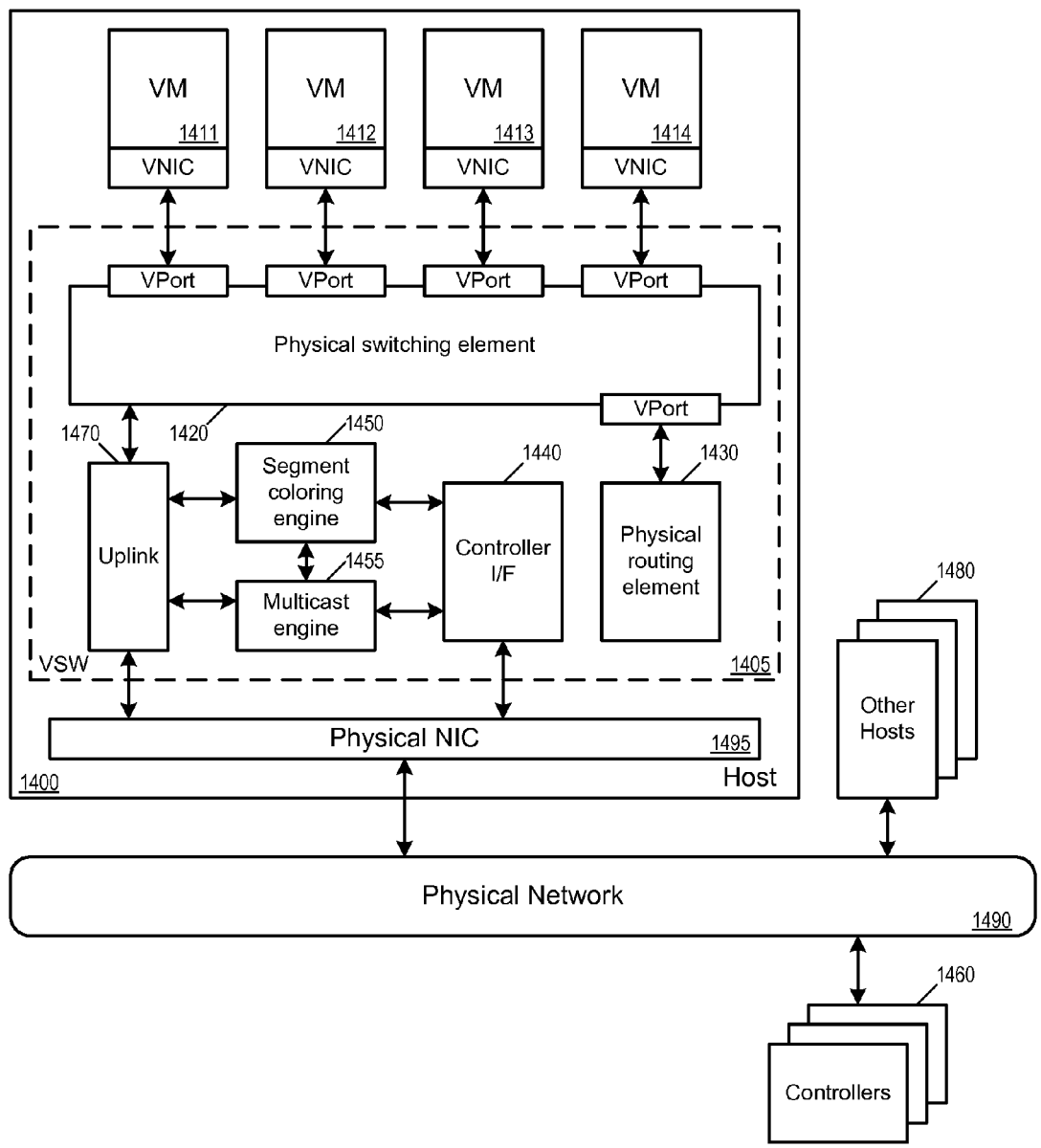
FIG. 14 illustrates an example host machine that is operating virtualization software or hypervisor.

As mentioned earlier, some embodiments of the invention are implemented by virtualization software or hypervisors running on host machines. For some embodiments, FIG. 14 illustrates an example host machine 1400 that is operating virtualization software 1405. The virtualization software 1405 allows the host machine to host virtual machines 1411-1414 as well as connecting the virtual machines to a physical network 1490. This physical network 1490 may span one or more data centers and include various physical switches and routers, and not all of the devices that constitute the physical network 1490 support BUM traffic.

As illustrated, the host machine 1400 has access to the physical network 1490 through a physical NIC (PNIC) 1495. The virtualization software 1405 serves as the interface between the hosted VMs 1411-1414 and the physical NIC 1495 (as well as other physical resources, such as processors and memory). Each of the VMs includes a virtual NIC (VNIC) for accessing the network through the virtualization software 1405. Each VNIC in a VM is responsible for exchanging packets between the VM and the virtualization software 1405. In some embodiments, the VNICs are software abstractions of physical NICs implemented by virtual NIC emulators.

The virtualization software 1405 manages the operations of the VMs 1411-1414, and includes several components for managing the access of the VMs to the physical network (by implementing the logical networks to which the VMs connect, in some embodiments). As illustrated, the virtualization software 1405 includes a physical switching element 1420, a physical routing element 1430, a controller interface 1440, an uplink module 1470, a segment coloring engine 1450, and a multicast engine 1455.

The controller interface 1440 receives control plane messages from a controller or a cluster of controllers 1460. In some embodiments, these control plane message includes configuration data for configuring the various components of the virtualization software and/or the virtual machines (such as the physical switching element 1420 and the physical routing element 1450). In some embodiments, the control plane messages also include programming information for MTEPs and PTEPs as discussed by reference to FIG. 13 above.

The segment coloring engine 1450 is for identifying L2 segment or multicast islands by performing segment coloring algorithms. The multicast engine 1455 allows the host machine 1400 to be a multicast endpoint (i.e., to be part of a multicast group) or to serve as a PTEP or a MTEP by performing operations described above in Sections I and II. The multicast engine 1455 communicates with the uplink module 1470 to forward multicast traffic to host machines in local segment. The multicast engine 1455 also reformats multicast traffic into unicast traffic for delivery to multicast proxies in remote segments. Though illustrated as two separate modules, the multicast engine 1455 and the segment coloring engine 1450 are parts of a same module within the virtualization software 1405 in some embodiments.

The physical switching element 1420 delivers network data to and from the physical NIC 1495, which interfaces the physical network 1490. The physical switching element also includes a number of virtual ports (vPorts) that communicatively interconnects the physical NIC with the VMs 1411-1414, the physical routing element 1430 and the controller interface 1440. Each virtual port is associated with a unique L2 MAC address, in some embodiments. The physical switching element performs L2 link layer packet forwarding between any two network elements that are connected to its virtual ports. The physical switching element also performs L2 link layer packet forwarding between any network element connected to any one of its virtual ports and a reachable L2 network element on the physical network 1490 (e.g., another VM running on another host).

The physical routing element 1430 performs L3 routing (e.g., by performing L3 IP address to L2 MAC address resolution) on data packets received from a virtual port on the physical switching element 1420. Each routed data packet is then sent back to the physical switching element 1420 to be forwarded to its destination according to the resolved L2 MAC address. This destination can be another VM connected to a virtual port on the physical switching element 1420, or a reachable L2 network element on the physical network 1490 (e.g., another VM running on another host, a physical non-virtualized machine, etc.).

The uplink module 1470 relays data between the physical switching element 1420 and the physical NIC 1495. In some embodiments, the uplink module 1470 allows the host machine 1400 to serve as a tunnel endpoint for encapsulation overlay networks such as VXLAN and VLANs. VXLAN is an overlay network encapsulation protocol. An overlay network created by VXLAN encapsulation is sometimes referred to as a VXLAN network, or simply VXLAN. When a VM on the host 1400 sends a data packet (e.g., an ethernet frame) to another VM in the same VXLAN network but on a different host, the uplink module 1470 encapsulates the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The uplink module 1470 also decapsulates incoming VXLAN packets and forwards only the original inner data packet to the destination VM.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this document, the term "packet" refers to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 15:
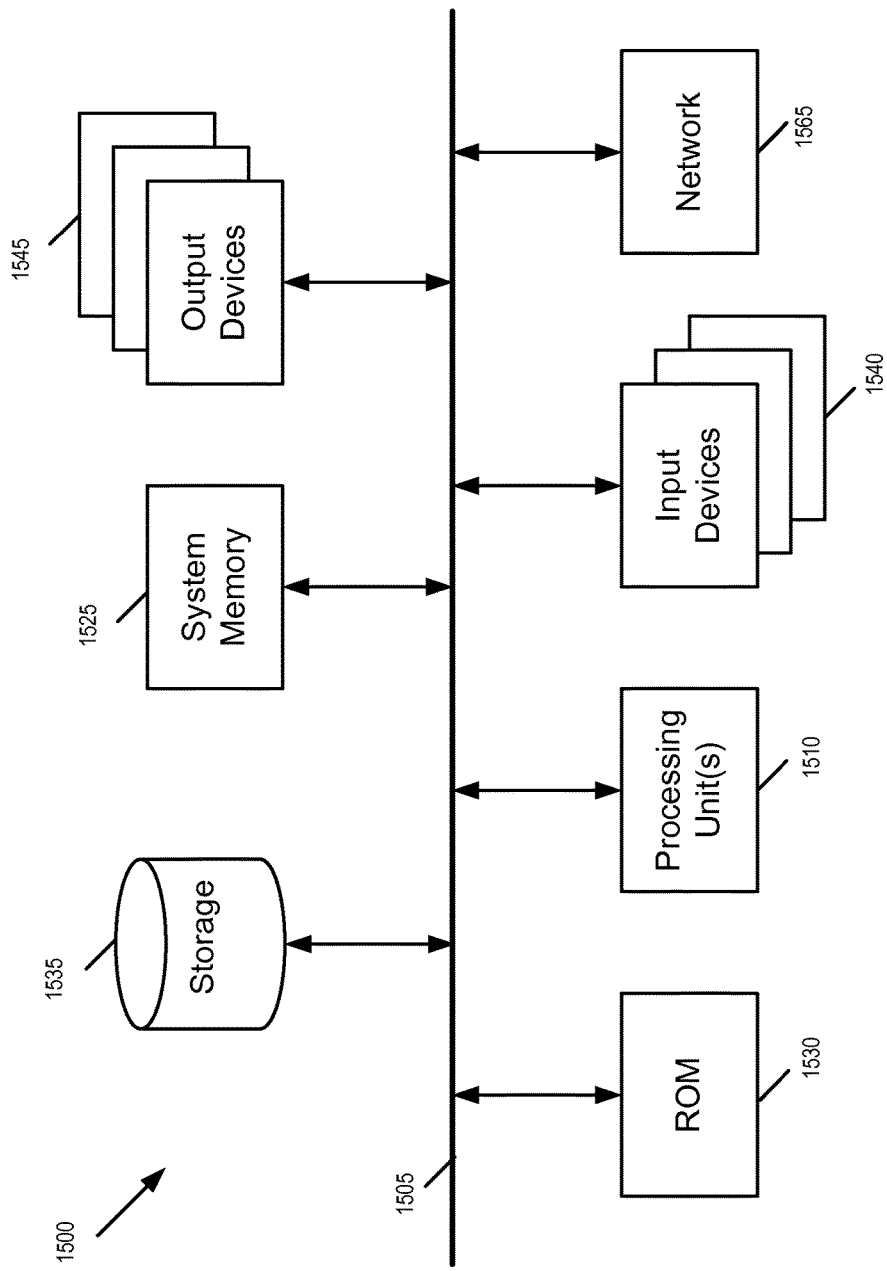
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 10-12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for defining how multicast messages have to be forwarded in an overlay logical network comprising a first plurality of tunnel endpoints including first and second tunnel endpoints, the method comprising:
    defining a multicast group comprising a second plurality of tunnel endpoints in the overlay logical network, the second plurality of tunnel endpoints being a subset of tunnel endpoints in the first plurality of tunnel endpoints and comprising the second tunnel endpoint but not the first tunnel endpoint; and
    for the first tunnel endpoint that is not a member of the multicast group, selecting the second tunnel endpoint for (i) receiving a message by unicast from the first tunnel endpoint, (ii) replicating the received message for each other tunnel endpoint in the multicast group, and (iii) forwarding each replicated message to a different tunnel endpoint in the multicast group.

2. The method of claim 1, wherein the first tunnel endpoint is a hardware switch for bridging a physical network with the overlay logical network, wherein the physical network does not support packets encapsulated in the overlay logical network.

3. The method of claim 1, wherein the overlay logical network is a Virtual Extensible LAN (VXLAN).

4. The method of claim 1, wherein the received message has a destination Media Access Control (MAC) address that corresponds to all tunnel endpoints in the overlay logical network.

5. The method of claim 1, wherein replicating and forwarding the received message to each other tunnel endpoint in the multicast group comprises multicasting the received message to all tunnel endpoints in the multicast group by Internet Protocol (IP) multicast.

6. The method of claim 1, wherein the overlay logical network is implemented over a plurality of link layer segments, the method further comprising selecting a third plurality of tunnel endpoints as multicast proxy endpoints, each multicast proxy endpoint for replicating messages to endpoints in a different link layer segment.

7. The method of claim 6, wherein the second tunnel endpoint replicates the received message for each multicast proxy endpoint and forwards each replicated message to a different multicast proxy endpoint in the third plurality of endpoints.

8. The method of claim 1, wherein each tunnel endpoint in the multicast group operates on a host machine that hosts one or more virtual machines having link layer connectivity with the overlay logical network.

9. A method of forwarding multi-cast messages in a logical network comprising a plurality of tunnel endpoints comprising first and second tunnel endpoints, the method comprising:
    at the second tunnel endpoint,
        receiving a message to multicast from a hardware forwarding element serving as the first tunnel endpoint, wherein the hardware forwarding element received the message to multicast from an element in a physical network, wherein the hardware forwarding element cannot send multicast messages for the logical network;
        replicating the received message for each tunnel endpoint in a multicast group of the logical network; and
        forwarding each replicated message to a different tunnel endpoint in the multicast group.

10. The method of claim 9, wherein the hardware forwarding element is a physical gateway for bridging the physical network to the logical network, wherein the physical network does not support packets encapsulated in the logical network.

11. The method of claim 9, wherein the received message is a broadcast message for all tunnel endpoints in the logical network.

12. The method of claim 9, wherein the message is received from the first tunnel endpoint as a unicast message through a tunnel.

13. The method of claim 12 further comprising replicating the received message and forwarding the replicated message as a unicast message to a third tunnel endpoint in the logical network that is not included in the multicast group.

14. The method of claim 9, wherein replicating and forwarding the received message to each tunnel endpoint in the multicast group comprises multicasting the received message to all tunnel endpoints in the multicast group by Internet Protocol (IP) multicast.

15. The method of claim 9, wherein replicating the received message to each tunnel endpoint in the multicast group comprises replicating the received message for a set of multicast proxy endpoints.

16. The method of claim 15 further comprising forwarding each replicated message to a different multicast proxy endpoint as a unicast tunneling message through a tunnel.

17. The method of claim 9, wherein each endpoint in the multicast group operates on a host machine that hosts one or more virtual machines having link layer connectivity with the logical network.

18. A non-transitory machine readable medium storing a program for defining how multicast messages have to be forwarded in an overlay logical network comprising a first plurality of tunnel endpoints including first and second tunnel endpoints, the program for execution by at least one processing unit, the program comprising sets of instructions for:

defining a multicast group comprising a second plurality of tunnel endpoints in the overlay logical network, the second plurality of tunnel endpoints being a subset of tunnel endpoints in the first plurality of tunnel endpoints and comprising the second tunnel endpoint but not the first tunnel endpoint; and for the first tunnel endpoint that is not a member of the multicast group, selecting the second tunnel endpoint for (i) receiving a message by unicast from the first tunnel endpoint, (ii) replicating the received message for each other tunnel endpoint in the multicast group, and (iii) forwarding each replicated message to a different tunnel endpoint in the multicast group.

19. The non-transitory machine readable medium of claim 18, wherein the first tunnel endpoint is a hardware switch for bridging a physical network with the overlay logical network, the physical network does not support packets encapsulated in the overlay logical network, and each tunnel endpoint in the multicast group operates on a host machine that hosts one or more virtual machines having link layer connectivity with the overlay logical network.

20. The non-transitory machine readable medium of claim 18, wherein the received message has a destination Media Access Control (MAC) address that corresponds to all tunnel endpoints in the overlay logical network.

21. The non-transitory machine readable medium of claim 18, wherein the set of instructions for replicating and forwarding the received message to each other tunnel endpoint in the multicast group comprises a set of instructions for multicasting the received message to all tunnel endpoints in the multicast group by Internet Protocol (IP) multicast.

* * * * *